United States Patent
Park et al.

(10) Patent No.: US 9,882,396 B2
(45) Date of Patent: Jan. 30, 2018

(54) NON-CONTACT TYPE POWER TRANSMISSION APPARATUS AND METHOD THEREOF AND LOCATION-BASED SERVICE SYSTEM USING THE SAME

(71) Applicant: SAMSUNG ELECTRO-MECHANICS CO., LTD., Suwon-Si (KR)

(72) Inventors: Sung Heum Park, Suwon-si (KR); Hyung Wook Cho, Suwon-si (KR); Sang Ho Cho, Suwon-si (KR); Chul Gyun Park, Suwon-si (KR); Jae Suk Sung, Suwon-si (KR); Chang Soo Kang, Suwon-si (KR); Ki Won Chang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 224 days.

(21) Appl. No.: 14/791,870

(22) Filed: Jul. 6, 2015

(65) Prior Publication Data
US 2016/0006266 A1   Jan. 7, 2016

(30) Foreign Application Priority Data

Jul. 7, 2014 (KR) .................. 10-2014-0084824
Nov. 3, 2014 (KR) .................. 10-2014-0151324

(51) Int. Cl.
*H02J 7/00* (2006.01)
*H02J 5/00* (2016.01)
(Continued)

(52) U.S. Cl.
CPC ............ *H02J 5/005* (2013.01); *H02J 7/0004* (2013.01); *H02J 7/025* (2013.01); *H02J 50/90* (2016.02);
(Continued)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS 9,190,849 B2 * 11/2015 Won ..................... G06Q 30/06
2009/0313032 A1 * 12/2009 Hafner .................. G06Q 30/02
705/1.1

(Continued)

FOREIGN PATENT DOCUMENTS

CN   102576243 A   7/2012
CN   102668309 A   9/2012
(Continued)

OTHER PUBLICATIONS

Partial European Search Report dated Apr. 26, 2016 in counterpart European Application No. 15175370.4 (6 pages).
(Continued)

*Primary Examiner* — Arun Williams
(74) *Attorney, Agent, or Firm* — NSIP Law

(57) ABSTRACT

A non-contact type power transmission apparatus and method thereof, includes a control unit configured to provide assigned location information to a device. The apparatus also includes a display unit configured to display location-based service data provided to the device based on the location information.

22 Claims, 23 Drawing Sheets

(51) Int. Cl.
*H04W 4/02* (2009.01)
*H04W 12/06* (2009.01)
*H02J 7/02* (2016.01)
*H02J 50/90* (2016.01)
*H04W 88/02* (2009.01)

(52) U.S. Cl.
CPC ........... *H04W 4/023* (2013.01); *H04W 12/06* (2013.01); *H02J 7/0047* (2013.01); *H04W 88/02* (2013.01)

(58) Field of Classification Search
USPC .......................................................... 320/108
See application file for complete search history.

(56) References Cited

U.S. PATENT DOCUMENTS

| | | |
|---|---|---|
| 2011/0195722 A1 | 8/2011 | Walter et al. |
| 2011/0221391 A1 | 9/2011 | Won et al. |
| 2012/0271723 A1* | 10/2012 | Penilla ................ G06Q 20/18 705/16 |
| 2013/0225082 A1 | 8/2013 | Kang et al. |
| 2014/0046707 A1 | 2/2014 | Hama |
| 2014/0125145 A1 | 5/2014 | Bae |

FOREIGN PATENT DOCUMENTS

| | | |
|---|---|---|
| CN | 102792552 A | 11/2012 |
| JP | 2006-262255 A | 9/2006 |
| JP | 2010-33479 A | 2/2010 |
| KR | 10-2013-0032472 A | 4/2013 |
| KR | 10-1262641 B1 | 5/2013 |
| KR | 10-2013-0082952 A | 7/2013 |
| WO | WO 2011/025692 A1 | 3/2011 |
| WO | WO 2011/063054 A1 | 5/2011 |
| WO | WO 2011/112060 A2 | 9/2011 |

OTHER PUBLICATIONS

Chinese Office Action issued in correspond Chinese Patent Application No. 201510394599.6 on Apr. 27, 2017 (15 pages in English; 10 pages in Chinese).

Chinese Office Action dated Oct. 10, 2017, in corresponding Chinese Application No. 201510394599.6 (17 pages in English, 10 pages in Chinese).

* cited by examiner

| | b₇ | b₆ | b₅ | b₄ | b₃ | b₂ | b₁ | b₀ |
|---|---|---|---|---|---|---|---|---|
| B₀ | Major Version | | | | Minor Version | | | |
| B₁ | (msb) Manufacturer Code | | | | | | | |
| B₂ | | | | | | | | (lsb) |
| B₃ | Exit | (msb) Basic Device Identifier | | | | | | |
| ... | | | | | | | | |
| B₆ | | | | | | | | (lsb) |

FIG. 5

NON-CONTACT TYPE POWER TRANSMISSION APPARATUS AND METHOD THEREOF AND LOCATION-BASED SERVICE SYSTEM USING THE SAME

CROSS-REFERENCE TO RELATED APPLICATION

This application claims the priority and benefit under 35 USC 119(a) of Korean Patent Application Nos. 10-2014-0084824 filed on Jul. 7, 2014 and 10-2014-0151324 filed on Nov. 3, 2014, with the Korean Intellectual Property Office, the disclosures of which are incorporated herein by reference.

BACKGROUND

1. Field

The following description relates to a non-contact type power transmission apparatus transmitting power in a non-contact manner, and a location-based service system using the same.

2. Description of Related Art

In accordance with development of wireless technology providing various functions, such as data transmission and power transmission, non-contact power transmission technology for wirelessly transmitting power to charge electronic devices in a non-contact manner has become a priority.

Technology in which power is wirelessly transmitted provides a mechanism to charge a mobile device without a physical contact with a charging device. Therefore, because the charging method is both convenient and offers a high degree of freedom to users, the technology for wireless power transmission has had various applications.

However, general wireless power charging technology only allows for the charging using a non-contact type power transmission apparatus and a non-contact type power reception apparatus, and is limited in that it may not provide separate user customized services.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a non-contact type power transmission apparatus, including a control unit configured to provide assigned location information to a device; and a display unit configured to display location-based service data provided to the device based on the location information.

The display unit may receive a selected of the location-based service data from a user, and the control unit may transmit the selected location-based service data to the device outside of the non-contact type power transmission apparatus, or requests transmission of the selected location-based service data from the device.

The control unit may include an information management unit configured to provide the location information to the device outside of the non-contact type power transmission apparatus, and a charging control unit configured to authenticate and charge the device.

The information management unit may provide the location information to the device in response to the authentication for the charging being determined.

The charging control unit may perform the authentication using at least one of telecommunications company information, terminal information, user information, or residual power information stored on a mobile terminal which is charged with power.

The charging control unit may determine the authority or a provision time for the charging using authentication information according to the location information.

The apparatus may also include a communications unit operatively connected to a server providing the location-based service data, wherein the control unit further comprises a service data management unit configured to receive the location-based service data associated with the location information from the server.

The communications unit may wirelessly communicate with a mobile terminal, and the information management unit may obtain user information assigned to the mobile terminal through the communications unit and provides the location information and the user information to the server.

The communications unit may transmit a selection from a user to the server.

The service data management unit may transmit to a mobile terminal the location-based service data received from the server through the communication unit.

In accordance with an embodiment, there is provided a location-based service apparatus, including a non-contact type power transmission apparatus configured to provide power in a non-contact manner to a mobile terminal through a non-contact type power reception apparatus, providing assigned location information, and displaying location-based service data received from a server, wherein the location-based service data is based on the location information of the non-contact type power transmission apparatus.

The non-contact type power transmission apparatus may transmit selected location-based service data in the displayed location-based service data to the mobile terminal according to a selection from a user, or requests the server to transmit the selected location-based service data to the mobile terminal according to the selection from the user.

The server may receive user information from the mobile terminal and provides the location-based service data.

The server may transmit the location-based service data to at least one of the non-contact type power transmission apparatus, the non-contact type power reception apparatus, and the mobile terminal.

The server may receive the location information from the non-contact type power transmission apparatus, a product code of the non-contact type power reception apparatus receiving power from the non-contact type power transmission apparatus, user information of the mobile terminal, and a product code of the non-contact type power reception apparatus charging the mobile terminal with power, and authenticates power transmission of the non-contact type power transmission apparatus in response to a match of the product codes.

The non-contact type power transmission apparatus may obtain a power transmission authentication from at least one of the non-contact type power reception apparatus, the mobile terminal, and the server, and transmits the power in the non-contact manner.

In accordance with an embodiment, there is provided a non-contact type power reception apparatus of a mobile terminal, including a power reception unit configured to wirelessly receives power and charge the mobile terminal using the wirelessly received power; and an information transferring unit configured to simultaneously receive location-based service data based on user information and location information thereof.

The location-based service data may include information associated with the location information of the mobile terminal.

The mobile terminal may transmit the user information of the mobile terminal to a non-contact type power transmission apparatus, without passing the user information by the non-contact type power reception apparatus.

In accordance with an embodiment, there is provided a non-contact type power transmission apparatus, including a charging control unit configured to authenticate a non-contact type power reception apparatus in a mobile terminal; a service data management unit configured to transmit to the mobile terminal location-based service data associated with a region in which the non-contact type power transmission apparatus is located and based on user information; and a power transmission unit configured to wirelessly transmit power to the mobile terminal, wherein the location-based service data and the power are simultaneously transmitted to the mobile terminal.

The apparatus may also include a display unit configured to display the location-based service data.

The charging control unit may perform authentication using at least one of telecommunications company information, terminal information, user information, and residual power information of the mobile terminal.

Other features and aspects will be apparent from the following detailed description, the drawings, and the claims.

BRIEF DESCRIPTION OF THE DRAWINGS

FIG. 5 is a reference diagram illustrating a configuration of a packet used to set a protocol for power transmissions in the non-contact type power transmission apparatus, in accordance with an embodiment;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
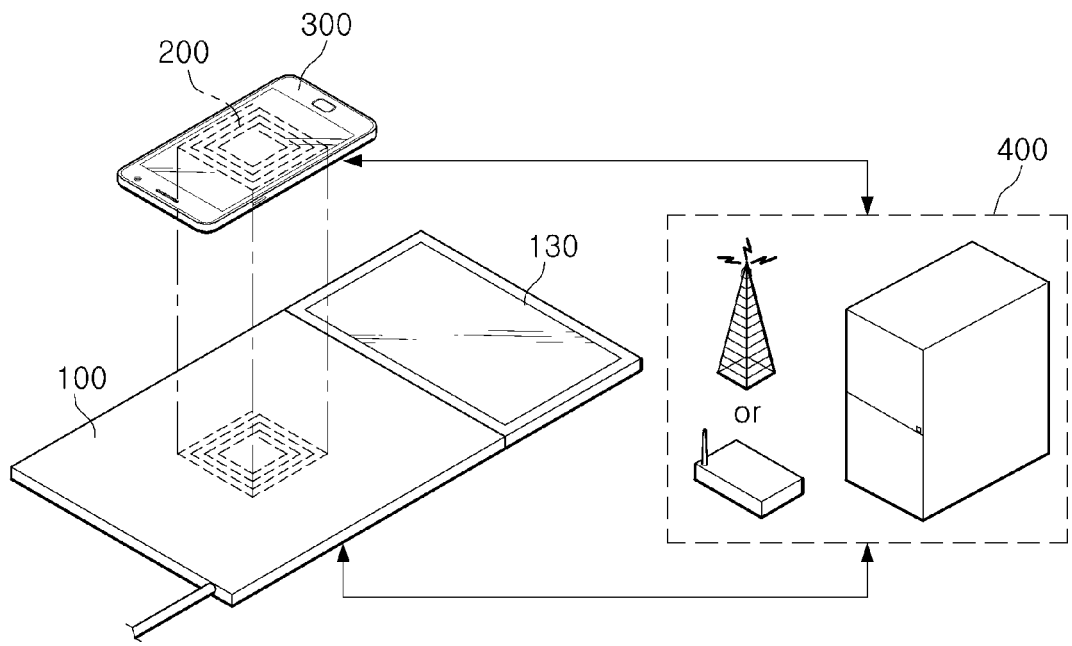
FIG. 1 is a configuration diagram illustrating a location-based service system, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that when an element or layer is referred to as being "on" or "connected to" another element or layer, it can be directly on or connected to the other element or layer or through intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

FIG. 1 is a configuration diagram illustrating a location-based service system, according to an embodiment.

As illustrated in FIG. 1, a location-based service system, according to an embodiment, includes a non-contact type power transmission apparatus 100, a non-contact type power reception apparatus 200, a mobile terminal 300, and a server 400.

The non-contact type power transmission apparatus 100 transmits power to the non-contact type power reception apparatus 200 in a non-contact manner.

In one illustrative configuration, the non-contact power transmissions is defined as power transmissions in which power is transmitted without using a direct connection between conductors on a power transmission side and a power reception side during a process in which power is transmitted from the power transmission side to the power reception side; in other words, in a non-contact manner, a wireless transmission manner, or similar transmission manners.

The non-contact type power transmission apparatus 100 receives location-based service data and displays the received location-based service data on a display unit 130. The display unit 130 is configured as a touch panel, twisted nematic panel, vertical alignment panel, in-plane switching panel, plane-to-line switching, advanced hyper-viewing angle panel, and other similar types of panels. The display unit 130 receives a selection from a user with respect to the received location-based service data.

Further, a location of the non-contact type power transmission apparatus 100 may be pre-defined or specified. In detail, because the non-contact type power reception apparatus 200 and the mobile terminal 300 are portable, the locations thereof may not be pre-defined or specified, but the location of the non-contact type power transmission apparatus 100 may be pre-defined or specified.

Information about the specified location of the non-contact type power transmission apparatus 100 is managed by the server 400, the mobile terminal 300, or structural element in the system network of FIG. 1. Hereinafter, although a description will be made based on an example in which the server 400 manages information regarding the location of the non-contact type power transmission apparatus 100, alternative embodiments thereof may be applied to other structural elements in the system network.

The non-contact type power reception apparatus 200 charges the mobile terminal 300 using power transmitted from the non-contact type power transmission apparatus 100.

According to an embodiment, the non-contact type power transmission apparatus 100 and the non-contact type power reception apparatus 200 are not limited to a specific wireless standard. For example, the non-contact type power transmission apparatus 100 and the non-contact type power reception apparatus 200 may operate while a communications scheme thereof at the time of wireless charging satisfies a preset standard as set by the Alliance for Wireless Power (A4WP). As another example, the non-contact type power transmission apparatus 100 and the non-contact type power reception apparatus 200 may operate while a preset communications scheme thereof at the time of wireless charging satisfies a standard as set by the Wireless Power Consortium or the Power Matters Alliance.

The mobile terminal 300 receives charging power from the non-contact type power reception apparatus 200. In addition, the mobile terminal 300 receives location-based service data from the server 400.

The server 400 communicates through a base station, an access point (AP), a gateway, or similar structural node device that allows the server 400 to communicate with the mobile terminal 300 through a network using Wi-Fi, or related standards, and identifies the non-contact type power transmission apparatus 100 to determine a location of the mobile terminal 300. In detail, because the location of the non-contact type power transmission apparatus 100 is specified, the server 400 identifies the non-contact type power transmission apparatus 100 to which the mobile terminal 300 accesses, and determines a specific location of the non-contact type power transmission apparatus 100 as the location of the mobile terminal 300.

The server 400 provides a location service associated with the determined location of the mobile terminal 300 to the mobile terminal 300 or the non-contact type power transmission apparatus 100.

Hereinafter, various embodiments of the location-based service system will be described with reference to the drawings. Contents that overlap with each other or correspond to each other will not be repeatedly described in various embodiments described hereinafter.

FIGS. 2A through 2H are block diagrams illustrating various embodiments of the location-based service system, in accordance with an embodiment.

Figure 2A:
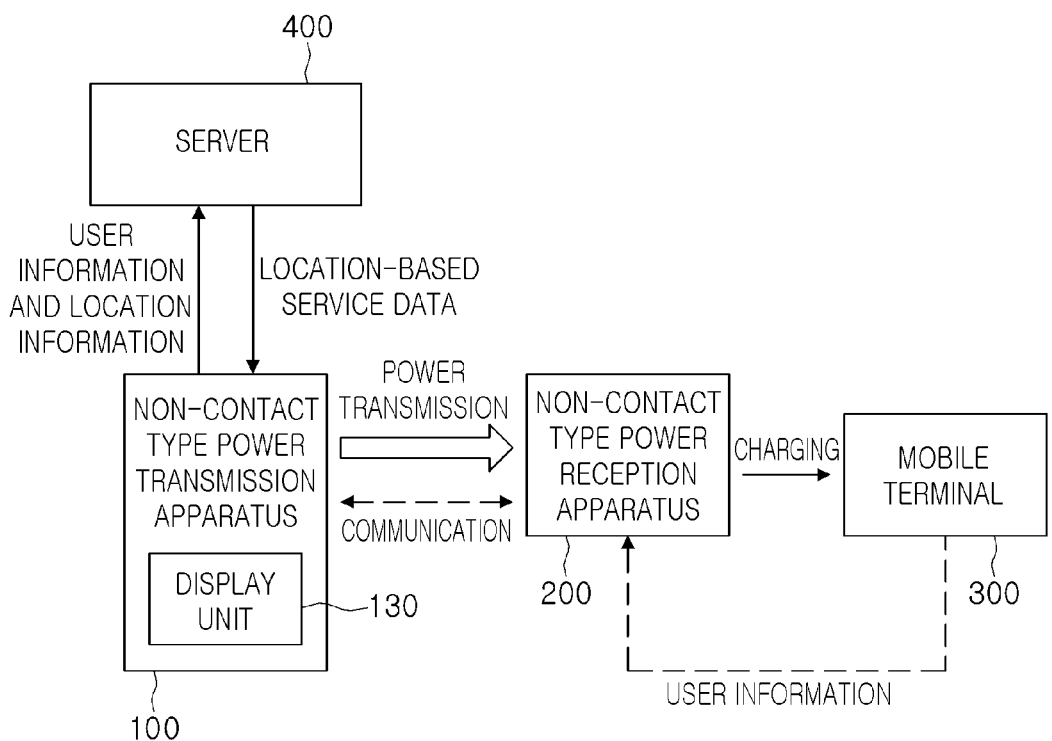
FIGS. 2A through 2H are block diagrams illustrating various embodiments of the location-based service system.

Referring to FIG. 2A, the non-contact type power transmission apparatus 100 transmits power in a non-contact manner to the non-contact type power reception apparatus 200. In accordance with one embodiment, after the non-contact type power transmission apparatus 100 authenticates the non-contact type power reception apparatus 200 or the mobile terminal 300, the non-contact type power transmission apparatus 100 transmits power.

The non-contact type power reception apparatus 200 wirelessly receives power from the non-contact type power transmission apparatus 100 and charges the mobile terminal 300 using the wirelessly received power. In one illustrative configuration, the non-contact type power reception apparatus 200 is an integral part of the mobile terminal 300, or may be a separate apparatus coupled to the mobile terminal 300. Furthermore, the non-contact type power reception apparatus 200 may be integrated into the mobile terminal 300 during manufacture. In another configuration, the non-contact type power reception apparatus 200 may be removable or a fixed structural apparatus internally or externally to the mobile terminal 300.

The mobile terminal 300 receives power from the non-contact type power reception apparatus 200. The mobile terminal 300 transmits user information to the non-contact type power reception apparatus 200, and the non-contact type power reception apparatus 200 transmits the user information of the mobile terminal 300 to the non-contact type power transmission apparatus 100. The non-contact type power transmission apparatus 100 transmits the user information together with location information of the non-contact type power transmission apparatus 100 to the server 400. In an example, the location information includes global positioning data or space-based satellite navigation data of the mobile terminal 300 that includes location and time information in all weather conditions, anywhere on or near the earth where there is an unobstructed line of sight of global positioning system satellites. In an example, the user information includes at least one of identification associated with the user, usage preference of the mobile terminal 300, and pre-defined settings from the user associated with the usage of the mobile terminal 300.

The server 400 identifies the location of the mobile terminal 300 based on the received location information and provides the location-based service data to the non-contact type power transmission apparatus 100 using the identified location. The user receives the location-based service data through the display unit 130. In one configuration, the location-based service data is displayed along with the user information identifying the user.

In one embodiment, the location-based service data from the server 400 may include various types of information associated with the location information of the mobile terminal 300. For example, the server 400 provides an advertisement, a coupon, restaurants, coffee shops, stores, hotels, and other information, associated with the location of the mobile terminal 300, as the location-based service. As another example, the server 400 also provides the use of the non-contact type power transmission apparatus 100 associated with the corresponding location at a discount or no cost as the location-based service data.

Figure 2B:
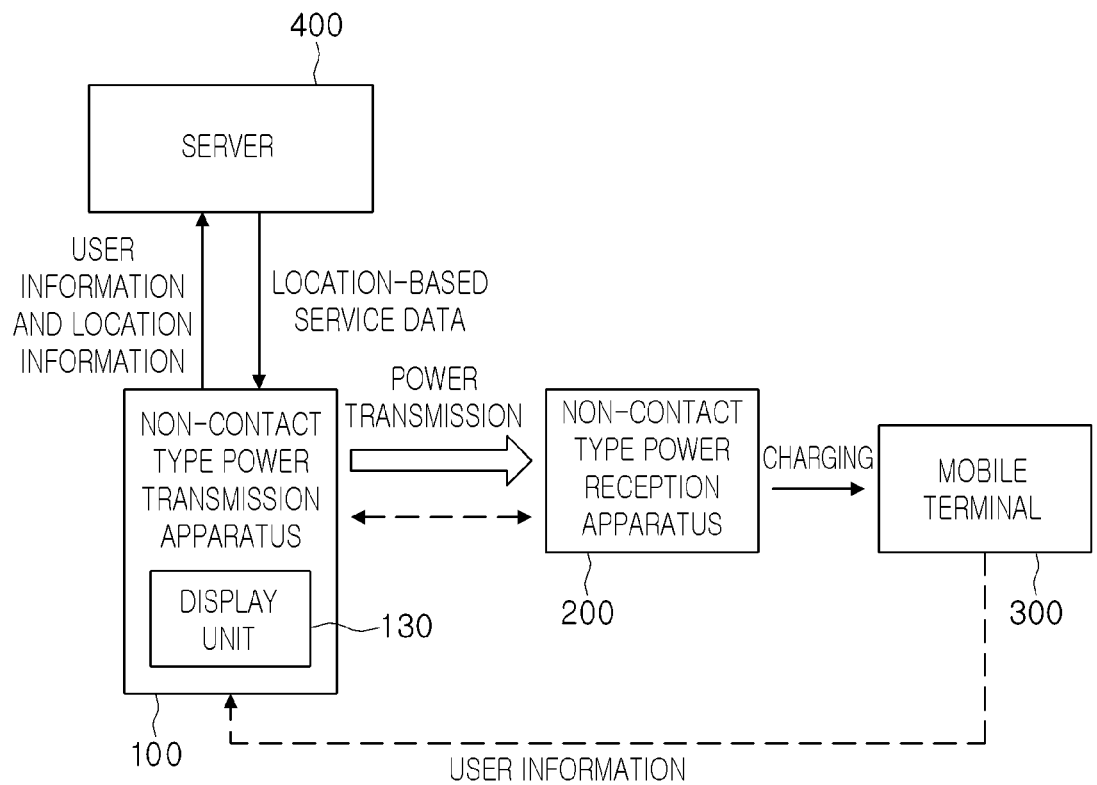

Referring to FIG. 2B, the mobile terminal 300 transmits the user information of the mobile terminal 300 to the non-contact type power transmission apparatus 100 without passing through the non-contact type power reception apparatus 200.

Figure 2C:
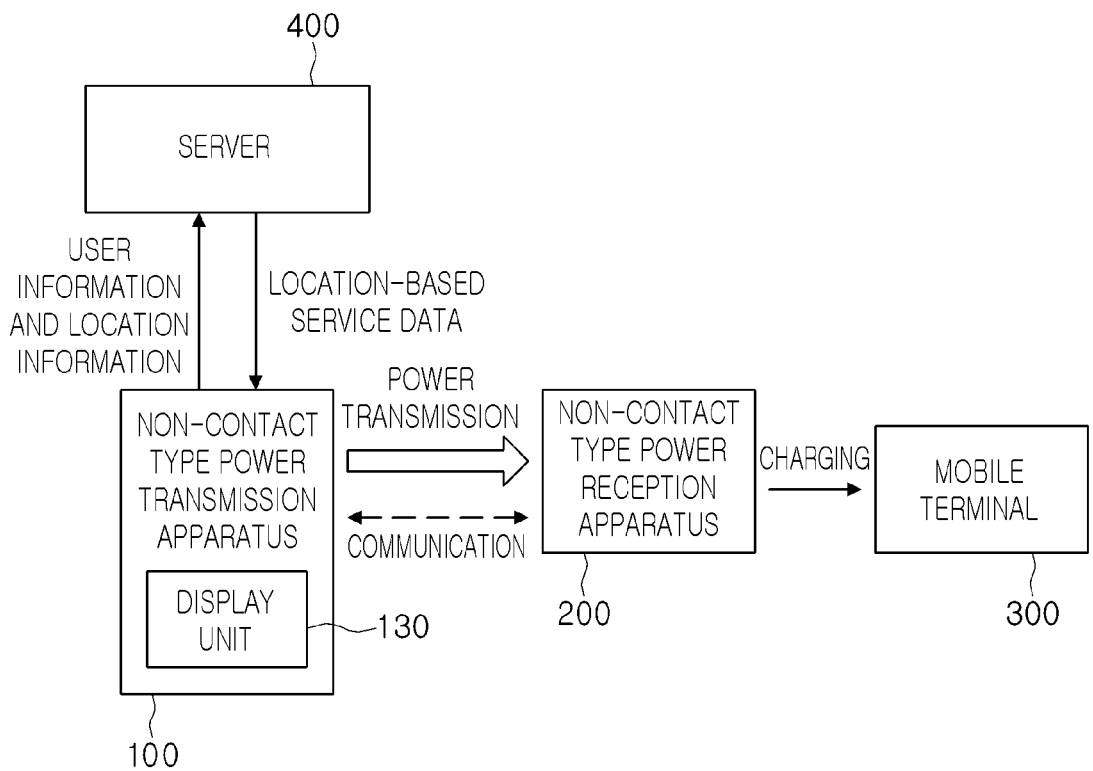

Referring to FIG. 2C, the non-contact type power transmission apparatus 100 receives the user information from the non-contact type power reception apparatus 200, and, in one example, the user information is prestored in the non-contact type power reception apparatus 200.

Figure 2D:
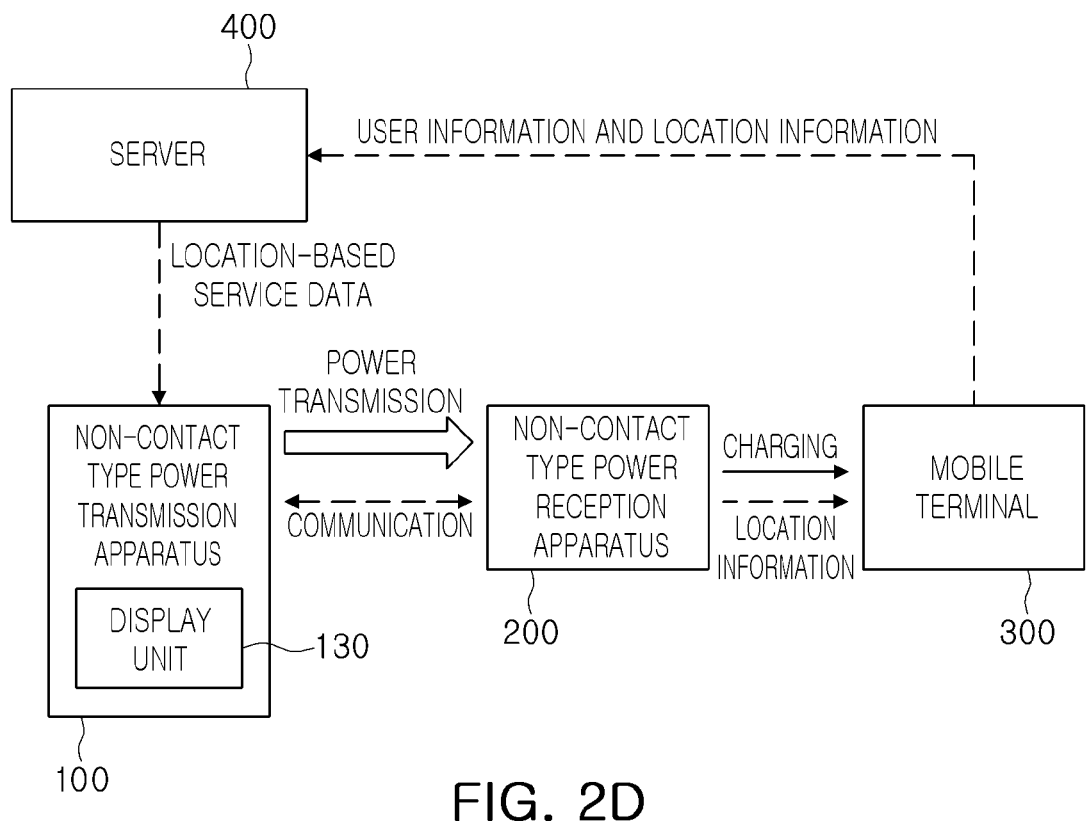

Referring to FIG. 2D, the mobile terminal 300 receives the location information of the non-contact type power transmission apparatus 100 through the non-contact type power reception apparatus 200 and transmits the received location information and individual user information to the server 400. The user receives the location-based service data from the server 400 through the display unit 130 of the non-contact type power transmission apparatus 100.

Figure 2E:
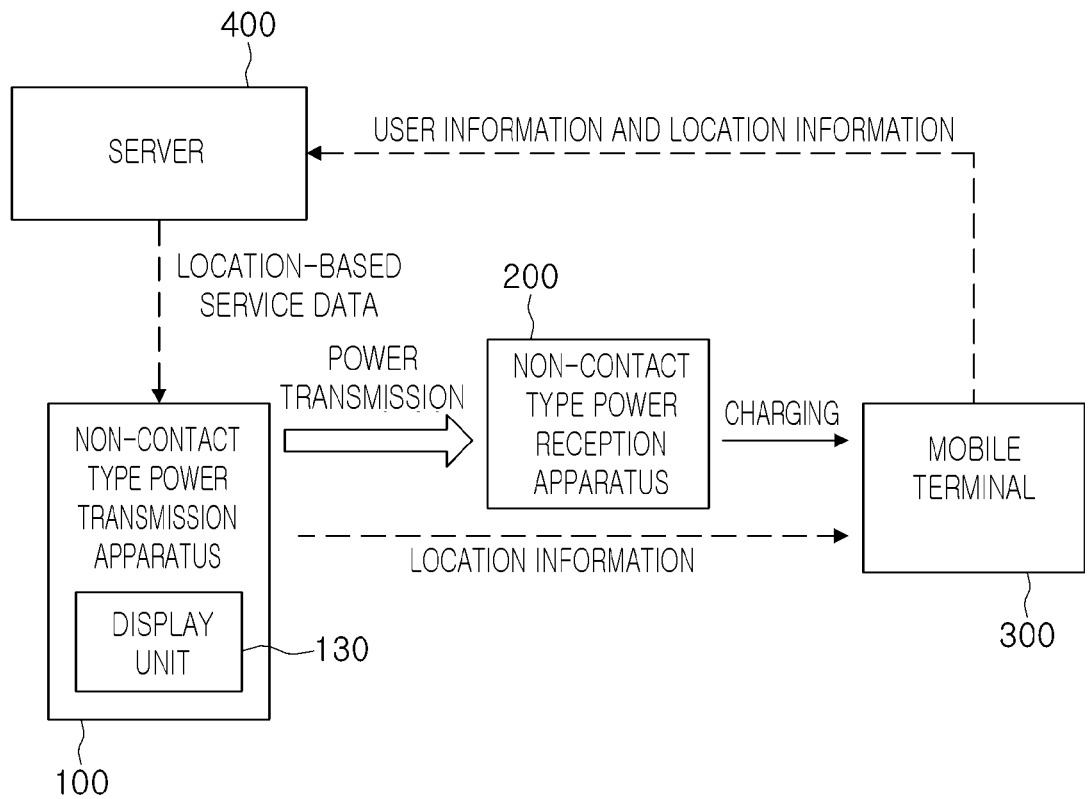

Referring to FIG. 2E, the mobile terminal 300 directly receives the location information from the non-contact type power transmission apparatus 100, without passing through the non-contact type power reception apparatus 200.

Figure 2F:
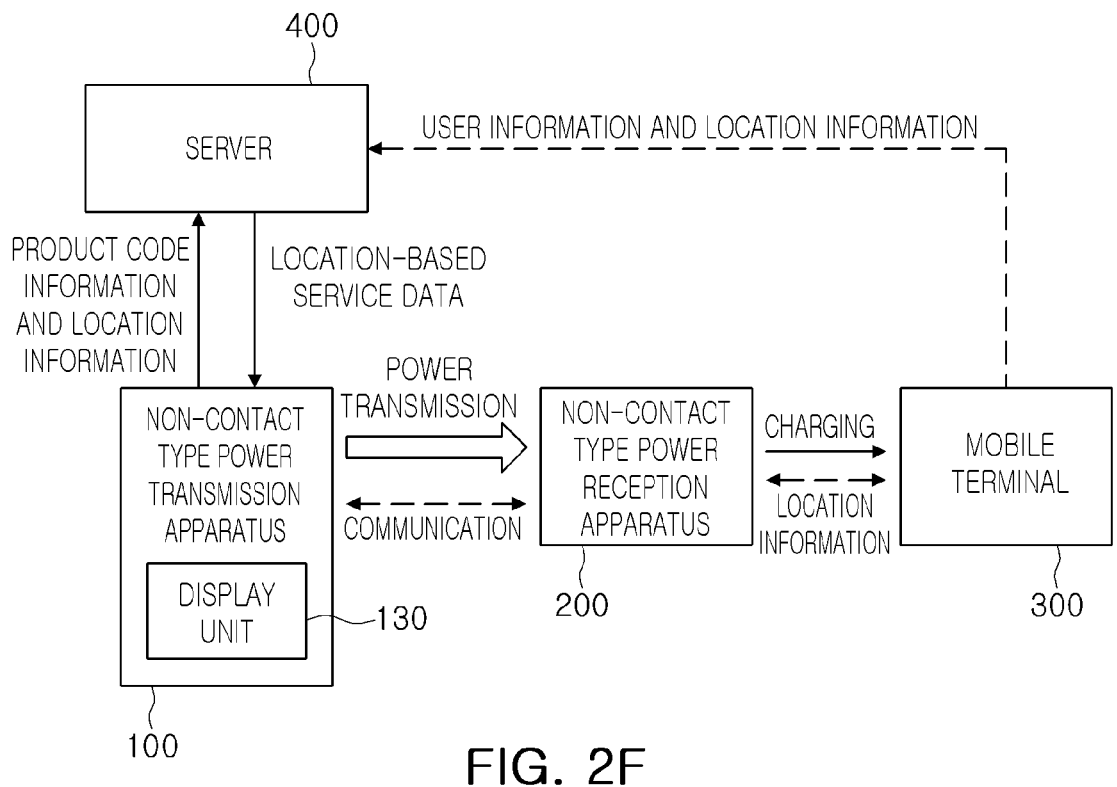

Referring to FIG. 2F, the non-contact type power reception apparatus 200 transmits an individual product code to the mobile terminal 300 and the non-contact type power transmission apparatus 100, the non-contact type power transmission apparatus 100 transmits the location information and the product code to the server 400, and the mobile terminal 300 transmits the user information and the product code to the server 400. The server 400 determines whether or not the product codes from the mobile terminal 300 and the non-contact type power transmission apparatus 100 match each other. If the product codes match, the server 400 authenticates a power transmission between the non-contact type power transmission apparatus 100 and the non-contact type power reception apparatus 200, and subsequently transmits the location-based service data to the non-contact type power transmission apparatus 100.

Figure 2G:
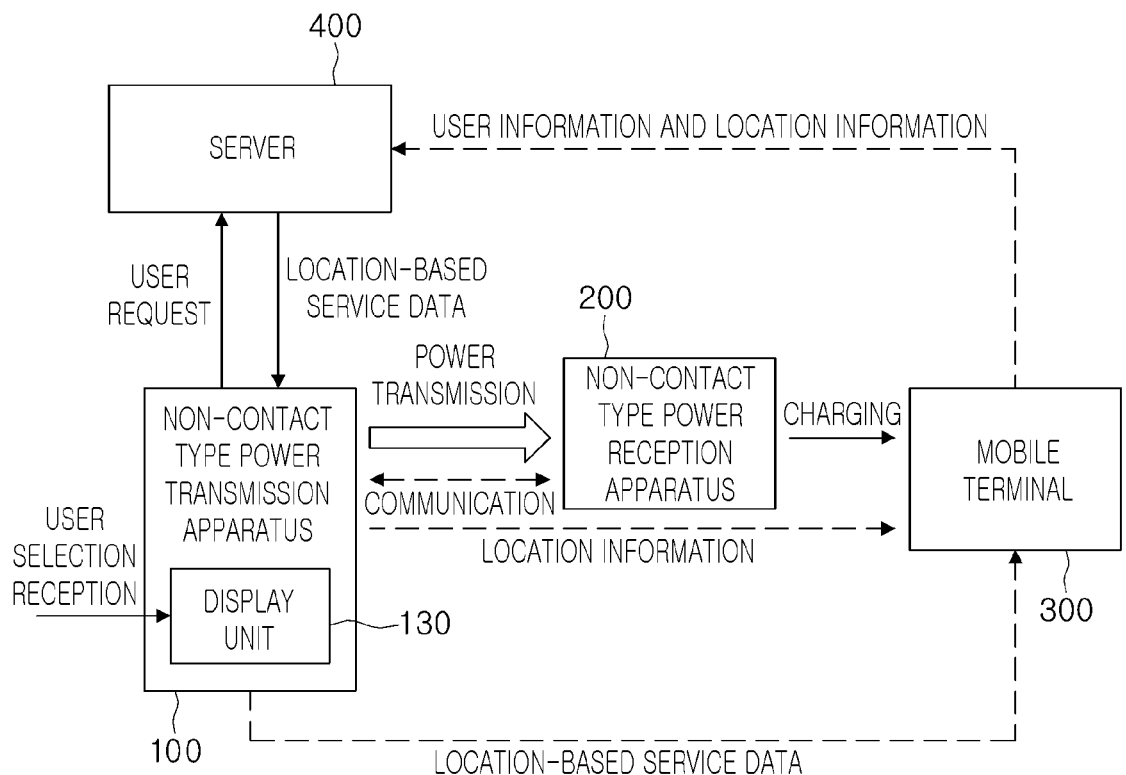

On the other hand, referring to FIG. 2G, the display unit 130 is configured as a touch panel, LCD, or other types of display panels, to receive a selection from the user. In detail, the display unit 130 transmits location-based service data, which is selected by the user from among the location-based service data from the server 400 to the non-contact type power transmission apparatus 100. The non-contact type power transmission apparatus 100 provides the user with the location-based service data through the display unit 130, or transmits the location-based service data to the mobile terminal 300.

Figure 2H:
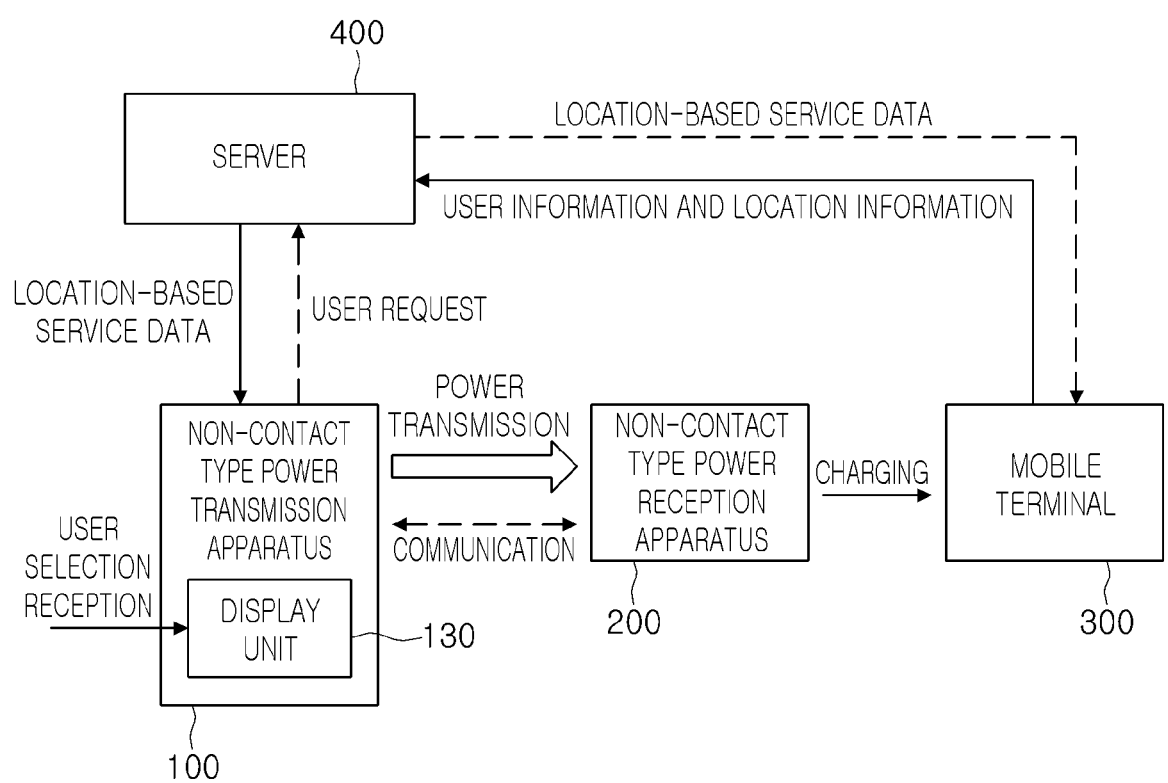

In addition, referring to FIG. 2H, the non-contact type power transmission apparatus 100 transmits a user request based on a selection from the user among the location-based service data from the server 400, to the server 400 through the display unit 130, and the server 400 transmits the location-based service data the user selected to the mobile terminal 300. For example, the server 400 may provide downloadable content such as coupons, free service authentication information, or advertisements associated with the identified location, to the mobile terminal 300.

Figure 3:
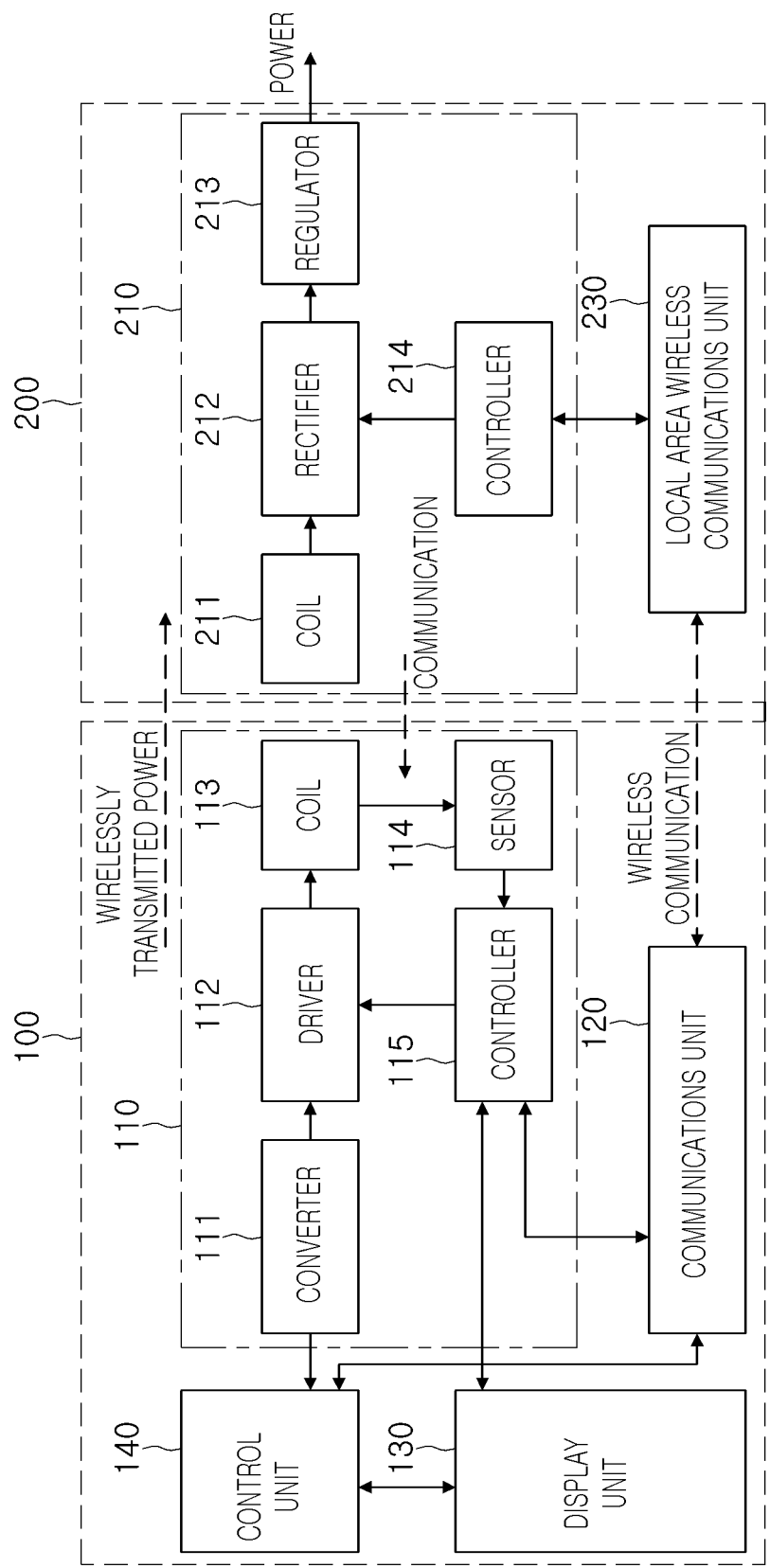
FIG. 3 is a block diagram illustrating an embodiment of a circuit of a non-contact type power transmission apparatus and a non-contact type power reception apparatus.

FIG. 3 is a block diagram illustrating an embodiment of a circuit of the non-contact type power transmission apparatus 100 and the non-contact type power reception apparatus 200.

Referring to FIG. 3, the non-contact type power transmission apparatus 100 includes a power transmission unit 110, a communications unit 120, a display unit 130, and a control unit 140.

The power transmission unit 110 includes a converter 111, a driver 112, a coil 113, and a controller 115. In accordance with an alternative embodiment, the power transmission unit 110 of the non-contact type power transmission apparatus 100 includes a sensor 114.

The converter 111 converts power that is input externally. The driver 112 amplifies a voltage converted by the converter 111 and applies the amplified voltage to the coil 113. The coil 113 transmits power in a non-contact manner in concert with a coil 211 of the non-contact type power reception apparatus 200.

The sensor 114 senses a state of the coil 113. The controller 115 adjusts the wireless provision of power by controlling the driver 112.

The communications unit 120 wirelessly transmits and receives predetermined data in concert with a local area wireless communications unit 230 of the non-contact type power reception apparatus 200.

The display unit 130 displays the location-based service data transmitted by the communications unit 120 and receives the selection from the user.

The control unit 140 performs various operations in regard to the location-based service, which will be described in detail with reference to the following drawings.

The non-contact type power reception apparatus 200 includes a power reception unit 210 and the local area wireless communications unit 230.

The power reception unit 210 includes the coil 211, a rectifier 212, a regulator 213, and a controller 214.

The coil 211 receives power from the coil 113 of the non-contact type power transmission apparatus 100 in a non-contact manner. The rectifier 212 rectifies power received at the coil 211.

The regulator 213 converts power rectified by the rectifier and provides the converted power to the mobile terminal 300.

The controller 214 controls an operation of the rectifier 212. The controller 214 additionally controls an operation of the regulator 213.

FIGS. 4A through 4E are configuration diagrams illustrating various embodiments of the non-contact type power transmission apparatus 100.

Figure 4A:
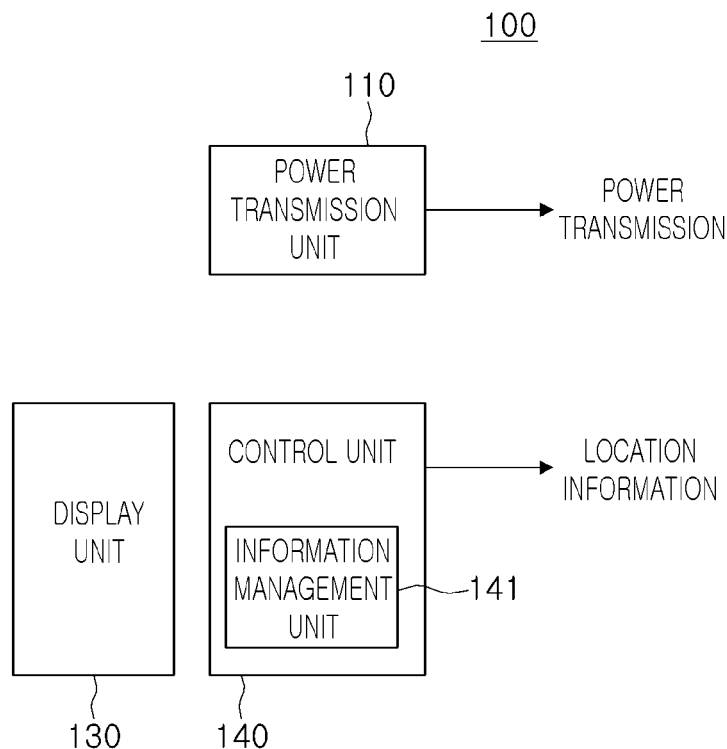
FIGS. 4A through 4E are block diagrams illustrating various embodiments of the non-contact type power transmission apparatus.

Referring to FIG. 4A, the non-contact type power transmission apparatus 100 includes the power transmission unit 110 and the control unit 140. The control unit 140 includes an information management unit 141.

The power transmission unit 110 transmits power in a non-contact manner to the non-contact type power reception apparatus 200.

The information management unit 141 provides location information assigned to the non-contact type power transmission apparatus 100 to other devices. In accord with some embodiments, the information management unit 141 directly or indirectly provides or transmits location information to the non-contact type power reception apparatus 200, the mobile terminal 300, or the server 400.

The display unit 130 displays the received location-based service data.

Figure 4B:
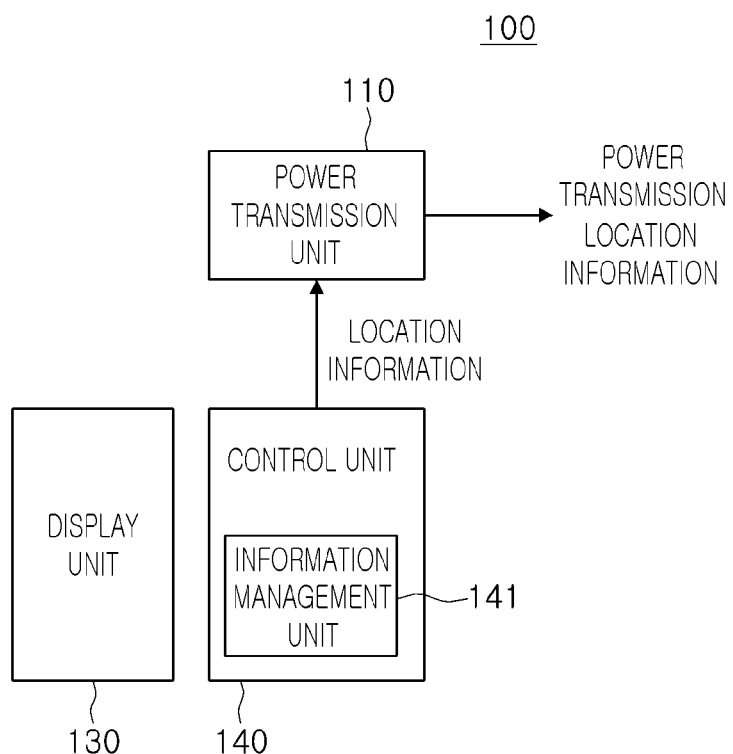

Referring to FIG. 4B, location information assigned to the non-contact type power transmission apparatus 100 is transmitted to other devices using a wireless power communications scheme. In detail, the information management unit 141 transmits location information assigned to the non-contact type power transmission apparatus 100, to the power transmission unit 110, and the power transmission unit 110 transmits the above-mentioned location information to other devices through the coil.

FIG. 5 is a reference diagram illustrating one configuration of a packet used to set a protocol for power transmissions in the non-contact type power transmission apparatus, in accordance with an embodiment.

The codes illustrated in FIG. 5 are manufacturer codes, and the basic device identifier illustrated in FIG. 5 is a unique identifier of a corresponding apparatus. For example, because the packet used in the protocol for power transmitted in a non-contact manner requires the unique identifier of a corresponding apparatus, such as, the non-contact type power transmission apparatus 100, location information assigned to the non-contact type power transmission apparatus 100 is provided to the non-contact type power reception apparatus 200 using the unique identifier of the above-mentioned packet.

Figure 4C:
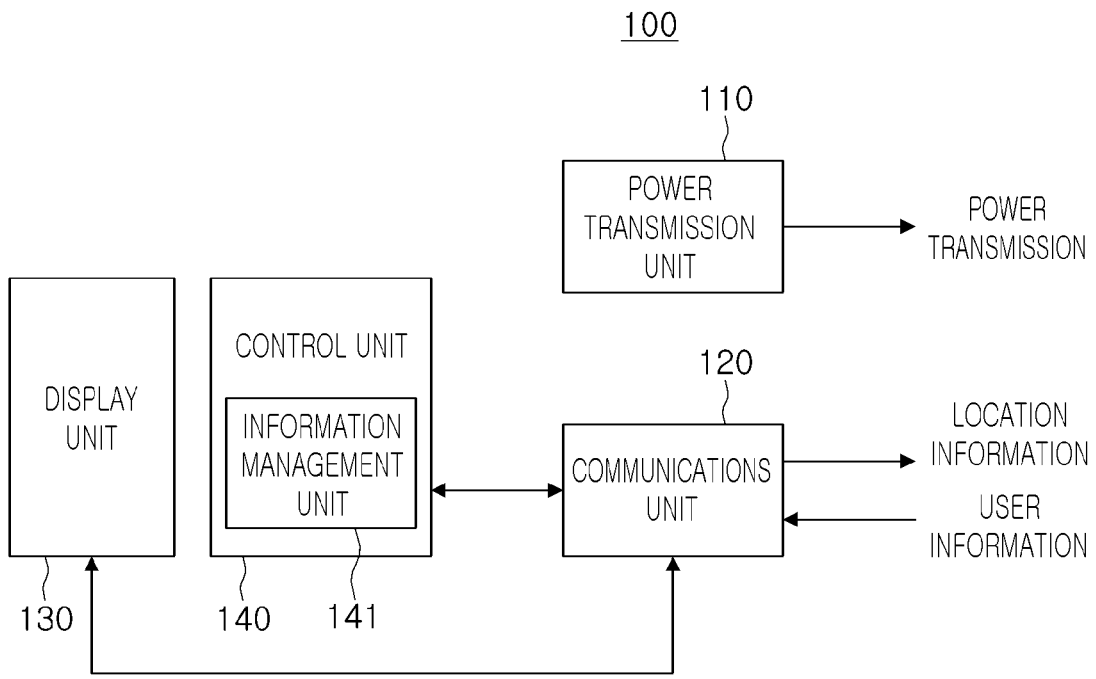

Referring to FIG. 4C, the non-contact type power transmission apparatus 100 further includes the communications unit 120.

The communications unit 120 performs local area wireless communications using a communication scheme such as near field communication (NFC), Bluetooth, Wi-Fi, Zigbee®, and the like.

The communications unit 120 transmits location information from the information management unit 141 of the non-contact type power transmission apparatus 100 to an external apparatus, for example, the non-contact type power reception apparatus 200 or the mobile terminal 300.

According to an embodiment, the communications unit 120 receives user information assigned to the mobile terminal 300. In detail, the communications unit 120 receives user information from the mobile terminal 300 or the non-contact type power reception apparatus 200, and provides the received user information to the information management unit 141. Further, the communications unit 120 receives the location-based service data from the server 400 and transmits the location-based service data to the display unit 130, and transmits the user selection from the display unit 130, to the server 400.

Figure 4D:
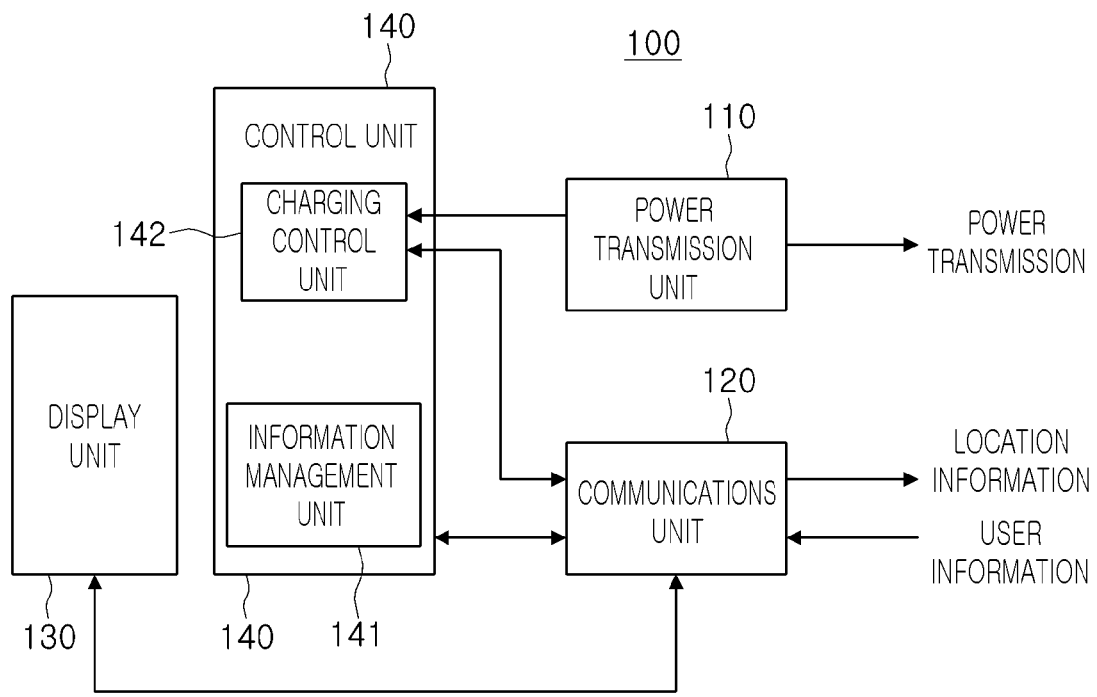

Referring to FIG. 4D, the control unit 140 of the non-contact type power transmission apparatus 100 includes the information management unit 141 and a charging control unit 142.

The charging control unit 142 authenticates authority for wireless charging of the non-contact type power reception apparatus 200.

According to an embodiment, the charging control unit 142 performs authentication using at least one of telecommunications company information, terminal information, user information, and residual power information of the mobile terminal 300 connected to the non-contact type power reception apparatus 200.

For example, the charging control unit 142 sets telecommunications company information to perform wireless charging, and identifies the telecommunications company information of the mobile terminal 300 to determine whether or not to perform wireless charging. As another example, the charging control unit 142 identifies residual power in the mobile terminal 300 to determine whether or not to provide power wirelessly.

According to an embodiment, when the authority for the wireless charging of the non-contact type power reception apparatus 200 is determined, the information management unit 141 transmits location information of the non-contact type power transmission apparatus 100 to the non-contact type power reception apparatus 200 or the mobile terminal 300. In one example, when the authority of the non-contact type power transmission apparatus 100 to perform the wireless charging is determined, the non-contact type power transmission apparatus 100 transmits the location-based service data.

Figure 4E:
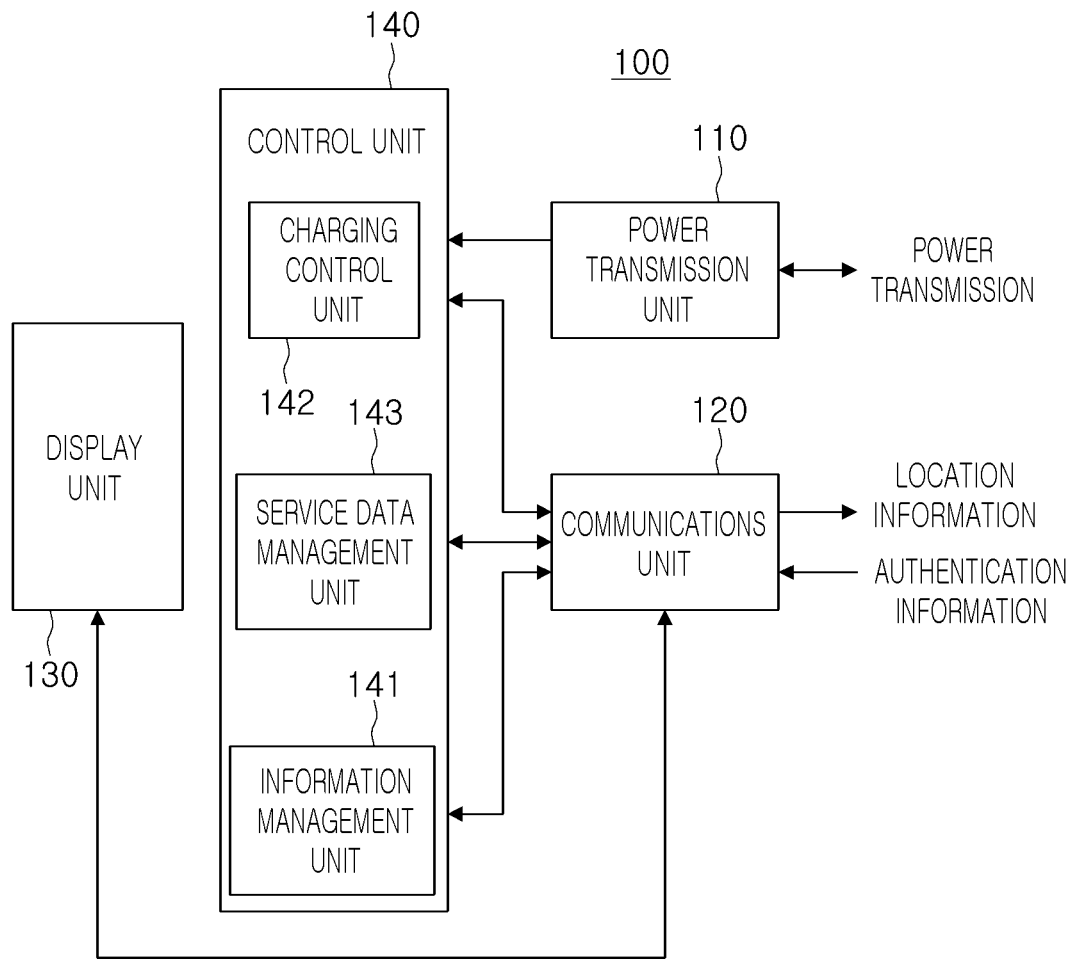

Referring to FIG. 4E, the control unit 140 of the non-contact type power transmission apparatus 100 includes the information management unit 141, the charging control unit 142, and a service data management unit 143.

The charging control unit 142 performs the authentication in concert with the server 400. For example, the charging control unit 142 determines the authority, a provision time, or other information, of the wireless charging for the non-contact type power reception apparatus 200 using authentication information provided by the server 400.

The service data management unit 143 receives from the server 400 location-based service data associated with a region in which the non-contact type power transmission apparatus 100 is located. The service data management unit 143 provides the received location-based service data to the mobile terminal 300 using a local area wireless communications module, or displays the received location-based service data. To this end, the non-contact type power transmission apparatus 100 displays the received location-based service data using the display unit 130 so that the user identifies the received location-based service data.

The information management unit 141 obtains user information stored on the mobile terminal 300, and transmits the obtained user information stored on the mobile terminal 300 to the server 400. According to embodiments, the information management unit 141 transmits to the server 400 user information stored on the mobile terminal 300 together with location information assigned to the non-contact type power transmission apparatus 100.

The communications unit 120 is connected to the server 400. The communications unit 120 is connected to the server using a wired or wireless network. The communications unit 120 receives from the server 400 information stored on the mobile terminal 300 or the location-based service data for providing a location-based service.

Figure 6A:
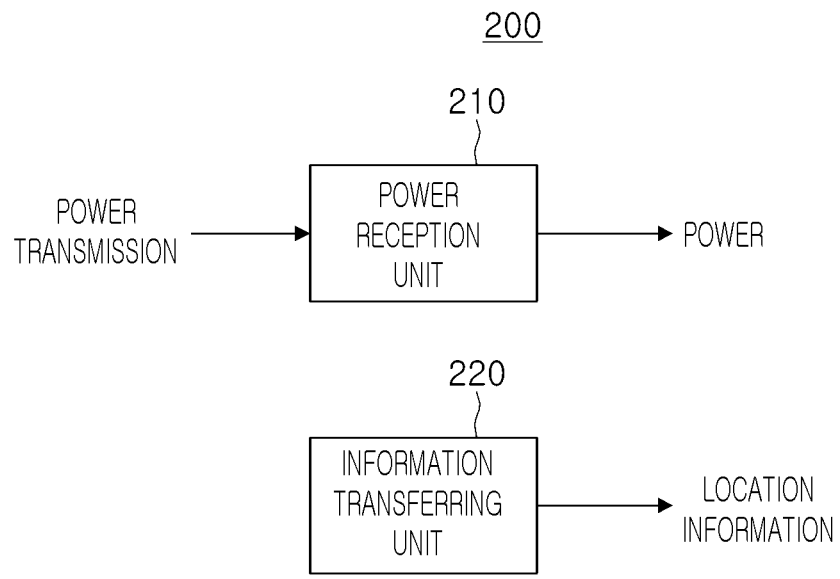
FIGS. 6A and 6B are configuration diagrams illustrating various embodiments of the non-contact type power reception apparatus.
Figure 6B:
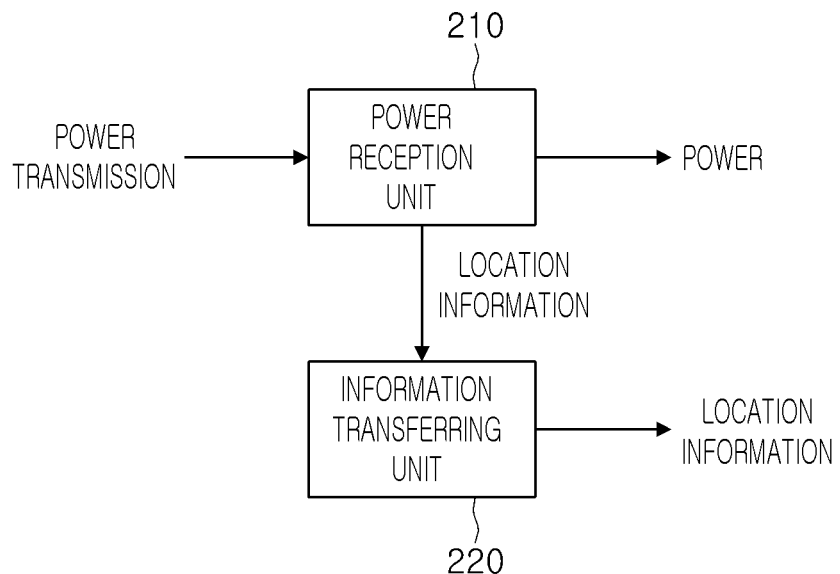

FIGS. 6A and 6B are configuration diagrams illustrating various embodiments of the non-contact type power reception apparatus 200.

FIG. 6A is a configuration diagram illustrating an embodiment of the non-contact type power reception apparatus 200.

The non-contact type power reception apparatus 200 includes the power reception unit 210 and an information transferring unit 220.

The power reception unit 210 receives power from the non-contact type power transmission apparatus 100. The power reception unit 210 is electrically connected to the mobile terminal 300, and charges the mobile terminal 300 with the received power.

The information transferring unit 220 transfers identification information between the non-contact type power transmission apparatus 100 and the mobile terminal 300.

According to an embodiment, the information transferring unit 220 receives from the non-contact type power transmission apparatus 100 location information assigned thereto, and transmits location information to the mobile terminal 300.

According to an embodiment, the information transferring unit 220 receives from the mobile terminal 300 user information assigned to the mobile terminal 300, and transmits the user information to the non-contact type power transmission apparatus 100.

Referring to FIG. 6B, the non-contact type power reception apparatus 200 transmits power to the mobile terminal 300 according to a specific non-contact type power provision scheme. The non-contact type power provision scheme is operated according to a preset transmission and reception protocol. In one example, a unique identifier to identify the non-contact type power transmission apparatus 100 is used in a transmission and reception protocol for power transmissions, and the information transferring unit 220 transmits the unique identifier of the non-contact type power transmission apparatus 100 as the location information for power transmission.

Although not illustrated, the information transferring unit 220 receives location information from the non-contact type power transmission apparatus 100 using the local area wireless communications unit 230. The information transferring unit 220 transmits the received location information to the mobile terminal 300.

Although not illustrated, the information transferring unit 220 obtains from the mobile terminal 300 user information assigned to the mobile terminal 300 through the local area wireless communications unit 230 or through a separate communication means. The information transferring unit 220 transmits the obtained user information to the non-contact type power transmission apparatus 100.

The structural elements described above may be incorporated or separated according to various embodiments so as to be implemented as respective structural circuit units. For example, the information management unit 141, the charging control unit 142, and the service data management unit 143 of the non-contact type power transmission apparatus 100 may be implemented in one integrated circuit corresponding to the control unit 140. Alternatively, the structural elements may be implemented as respective separate integrated circuits, or some functions being executed may also be implemented as software, and may also be implemented so as to be incorporated into the controller 115.

Figure 7A:
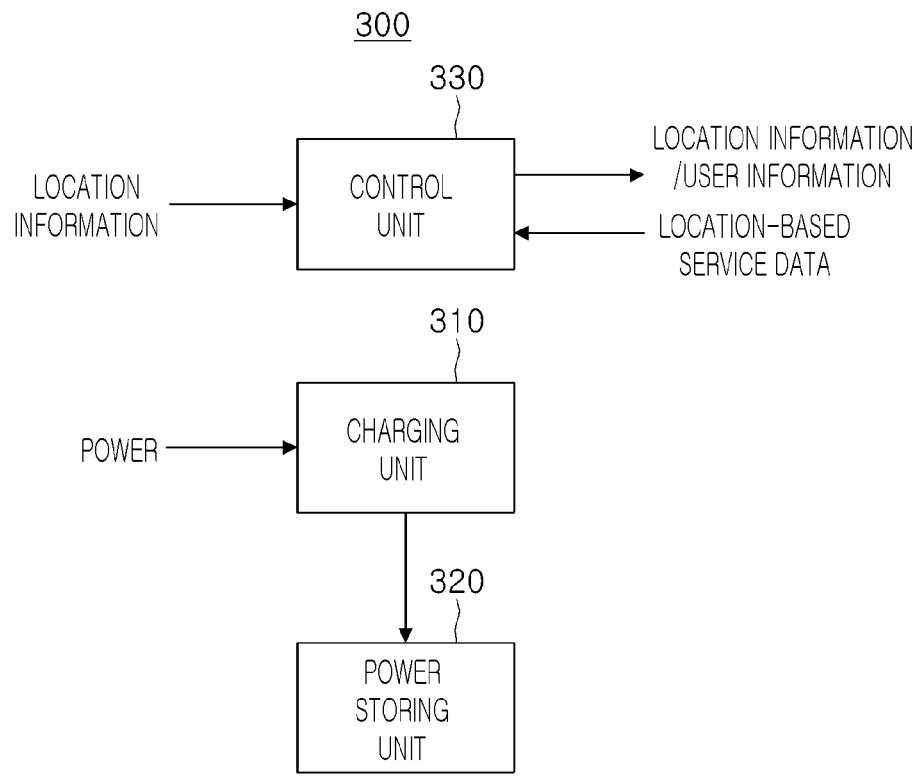
FIGS. 7A and 7B are configuration diagrams illustrating various embodiments of a mobile terminal.
Figure 7B:
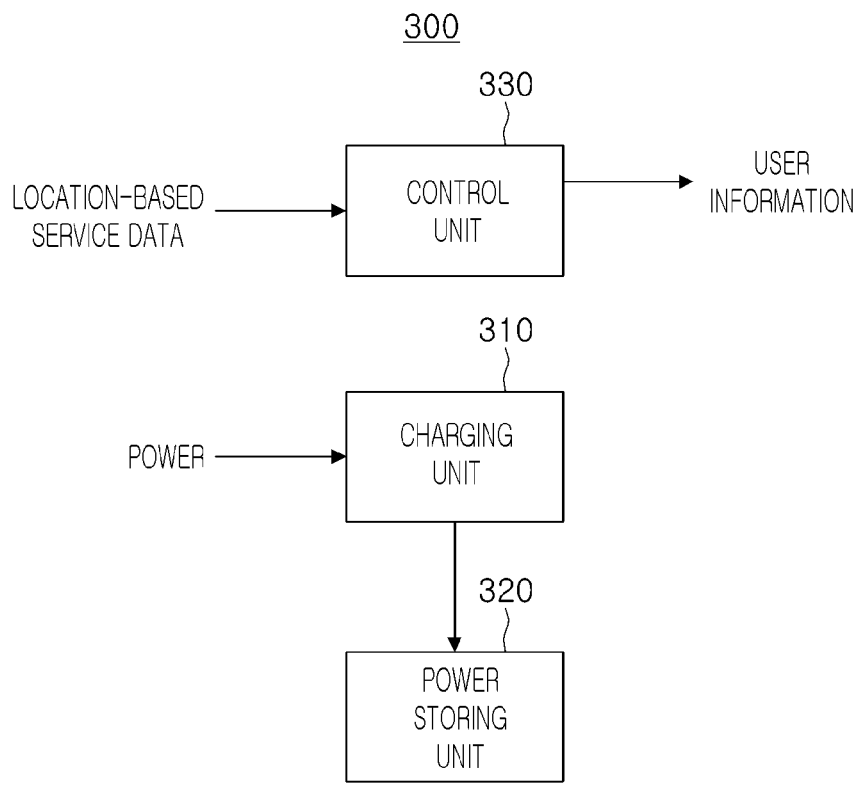

FIGS. 7A and 7B are configuration diagrams illustrating various embodiments of the mobile terminal 300.

Referring to FIG. 7A, the mobile terminal 300 includes a charging unit 310, a power storing unit 320, and a control unit 330.

The charging unit 310 is connected to the non-contact type power reception apparatus 200 so as to charge power. The charging unit 310 stores power in the power storing unit 320 transmitted from the non-contact type power reception apparatus 200.

The control unit 330 receives location information assigned to the non-contact type power transmission apparatus 100, and transmits to the server 400 user information or location information assigned to the mobile terminal 300. In one illustrative example, as described above, location information is associated with regional information regarding a region in which the non-contact type power transmission apparatus is located.

The control unit 330 receives from the server 400, location-based service data associated with the region in which the mobile terminal 300 is located.

Referring to FIG. 7B, the control unit 330 transmits user information, for example, identification information assigned to the mobile terminal 300, to the non-contact type power transmission apparatus 100. The non-contact type power transmission apparatus 100 transmits the identification information to the server 400, and receives the location-based service data associated with the region in which the mobile terminal is located. The control unit 300 receives the location-based service data from the non-contact type power transmission apparatus 100.

Although not illustrated in FIGS. 7A and 7B, the mobile terminal 300 may directly or indirectly communicate, for example, through various structural elements such as nodes, with the non-contact type power transmission apparatus 100 or the server 400 using the local area wireless communications module or a wireless communications module.

The functional configuration of the above-described mobile terminal 300 may also be implemented as an application which may be driven on the mobile terminal 300. According to an embodiment, the application executed on the mobile terminal, obtains or receives location information assigned to the non-contact type power transmission apparatus 100 that provides power in a non-contact manner, manages user information assigned to the mobile terminal 300, and transmits location information or user information to other devices. According to an embodiment, the application may further perform a function of receiving and displaying the location-based service data associated with the location of the mobile terminal 300.

Figure 8:
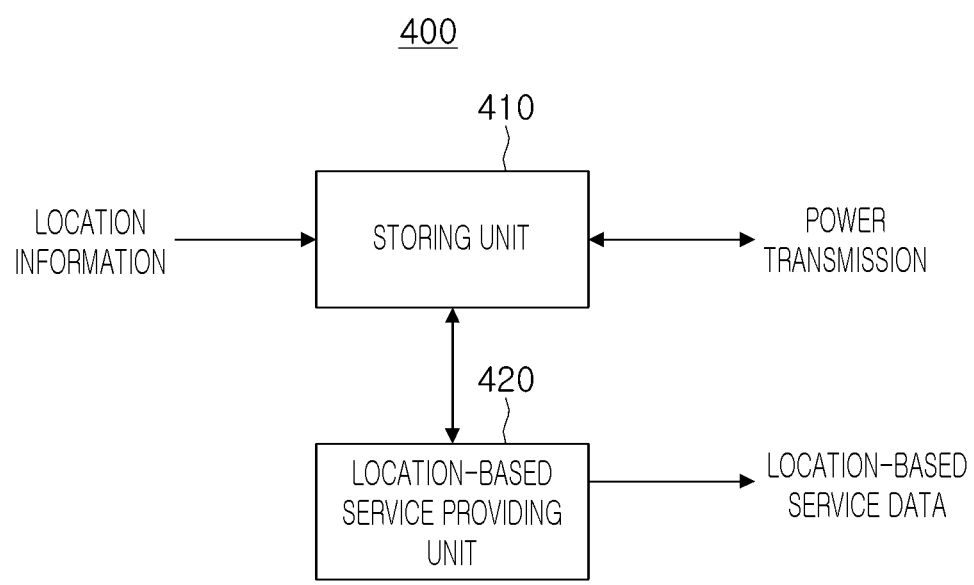
FIG. 8 is a configuration diagram illustrating an embodiment of a server.

FIG. 8 is a configuration diagram illustrating an embodiment of the server 400.

Referring to FIG. 8, the server 400 includes a storing unit 410 and a location-based service providing unit 420. Although not illustrated, the server 400 may include a communications unit which may be connected to the mobile terminal 300 or the non-contact type power transmission apparatus 100.

The storing unit 410 stores location data associated with location information assigned to the non-contact type power transmission apparatus 100 and regional information regarding a region in which the non-contact type power transmission apparatus 100 is located.

The location-based service providing unit 420 determines a location of the mobile terminal 300 receiving power from the non-contact type power transmission apparatus 100 using the location data.

According to an embodiment, the location-based service providing unit 420 determines the region in which the non-contact type power transmission apparatus 100 is located as the location of the mobile terminal 300. The region is determined by identifying location information assigned to the non-contact type power transmission apparatus 100 and user information assigned to the mobile terminal 300.

According to an embodiment, the location-based service providing unit 420 transmits the location-based service data associated with the determined location of the mobile terminal 300 to the mobile terminal 300 or the non-contact type power transmission apparatus 100.

Hereinabove, various examples of the location-based service system and various examples of the respective component apparatuses configuring the location-based service system according to various embodiments have been described.

Hereinafter, a location-based service method performed between respective apparatuses of the location-based service system will be described in more detail.

FIGS. 9A through 9E are flowcharts illustrating various examples of an authentication method performed to provide power, according to an embodiment.

Figure 9A:
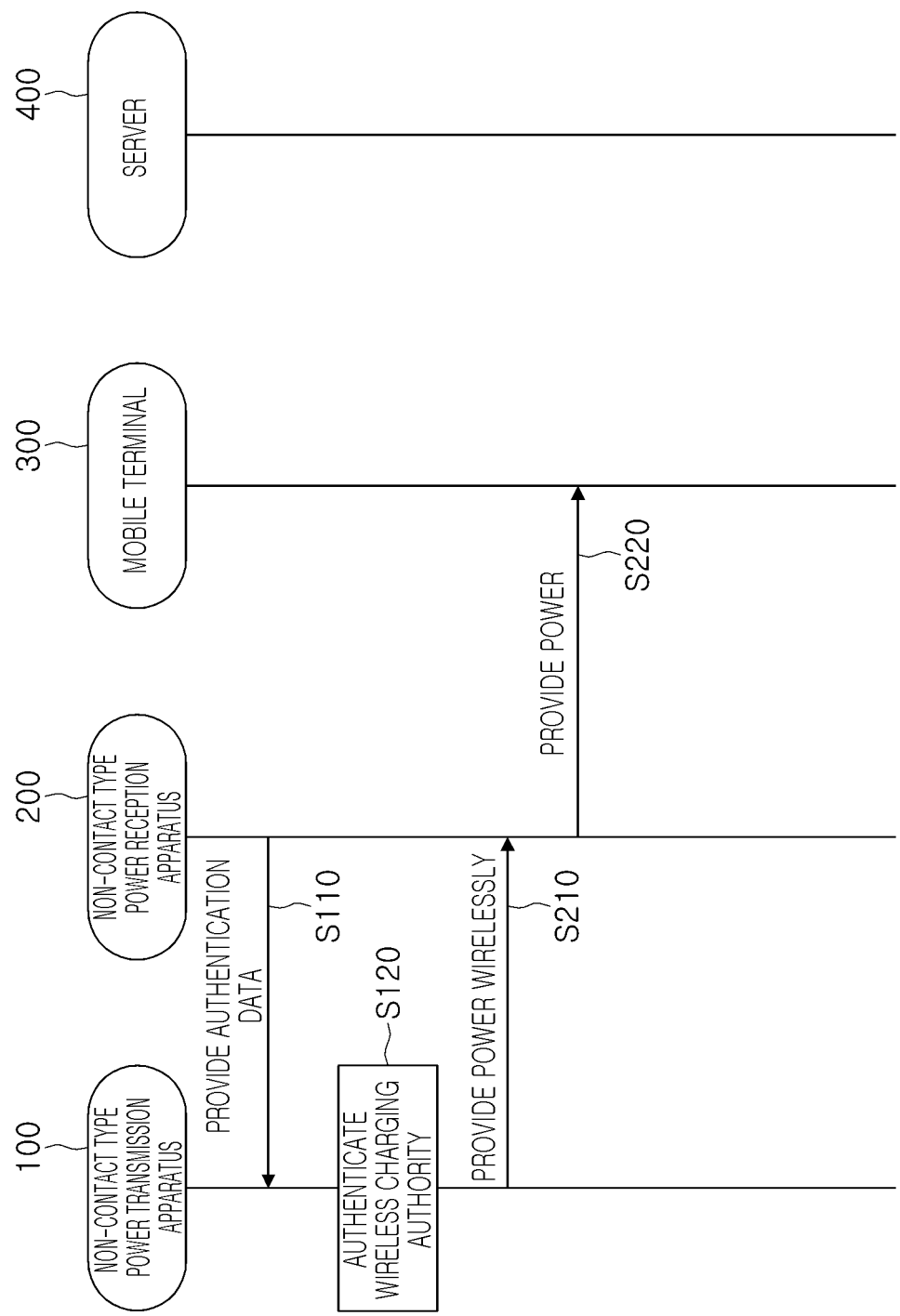
FIGS. 9A through 9E are flowcharts illustrating various embodiments of an authentication method performed to provide power.

Referring to FIG. 9A, at operation S110, the non-contact type power transmission apparatus 100 receives authentication data from the non-contact type power reception apparatus 200. In one example, the authentication data is an identifier assigned to the non-contact type power reception apparatus 200, or authentication data provided to the non-contact type power reception apparatus 200 from the mobile terminal 300. Alternatively, the authentication data is separate data for authentication, such as a personal bar code, stored on the mobile terminal 300.

At operation S120, the non-contact type power transmission apparatus 100 authenticates a wireless charging authority using authentication data. The wireless charging authority includes, for example, whether or not the mobile terminal 300 is a target of wireless charging, whether or not a charge occurs at the time of wireless charging, or whether or not a predetermined limit for wireless charging is present.

When the non-contact type power reception apparatus 200 is correctly authenticated, at operation S210, the non-contact type power transmission apparatus 100 provides or transmits power wirelessly. At operation S220, the non-contact type power reception apparatus 200 transmits the power wirelessly transmitted to the mobile terminal 300.

Figure 9B:
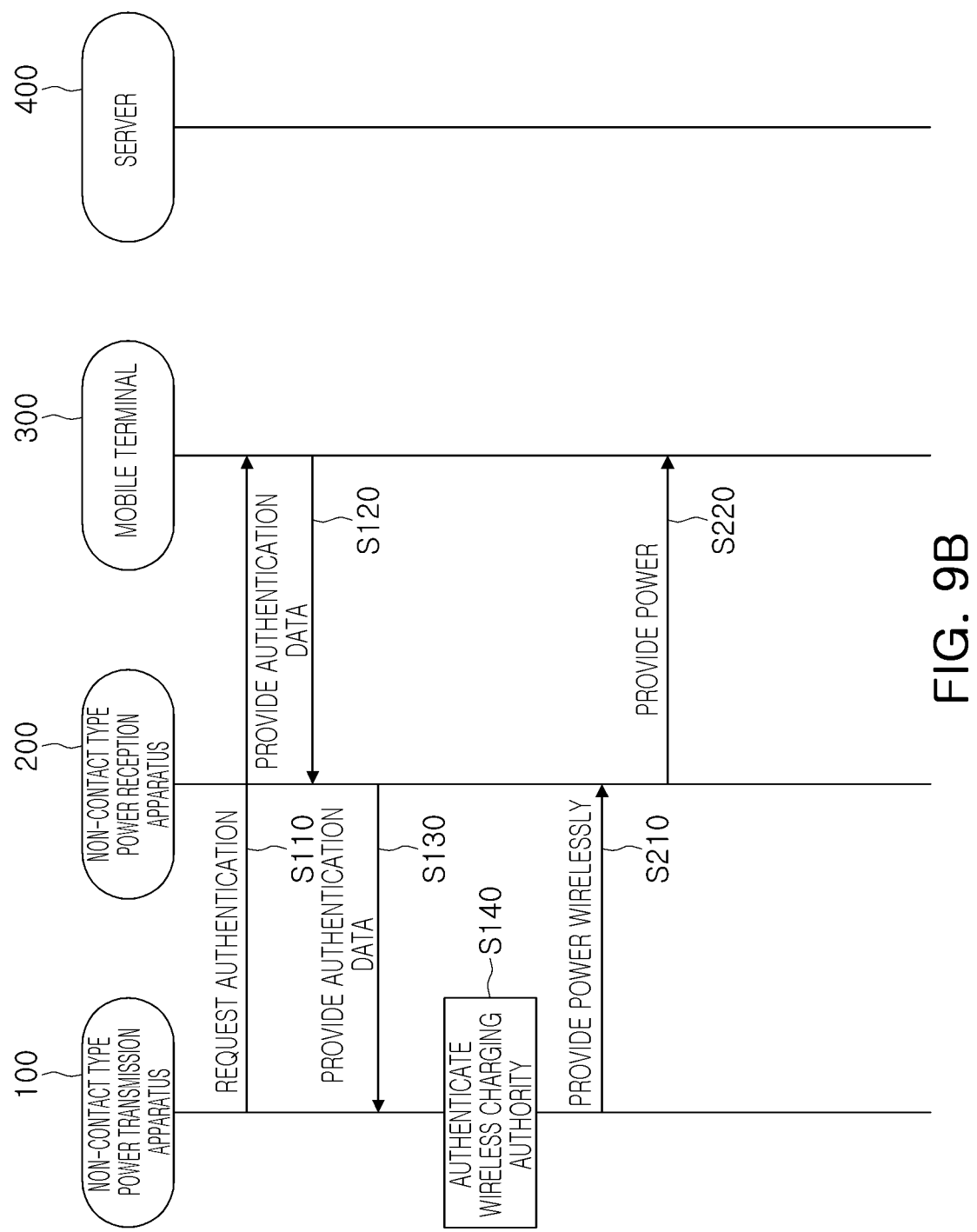
Figure 9C:
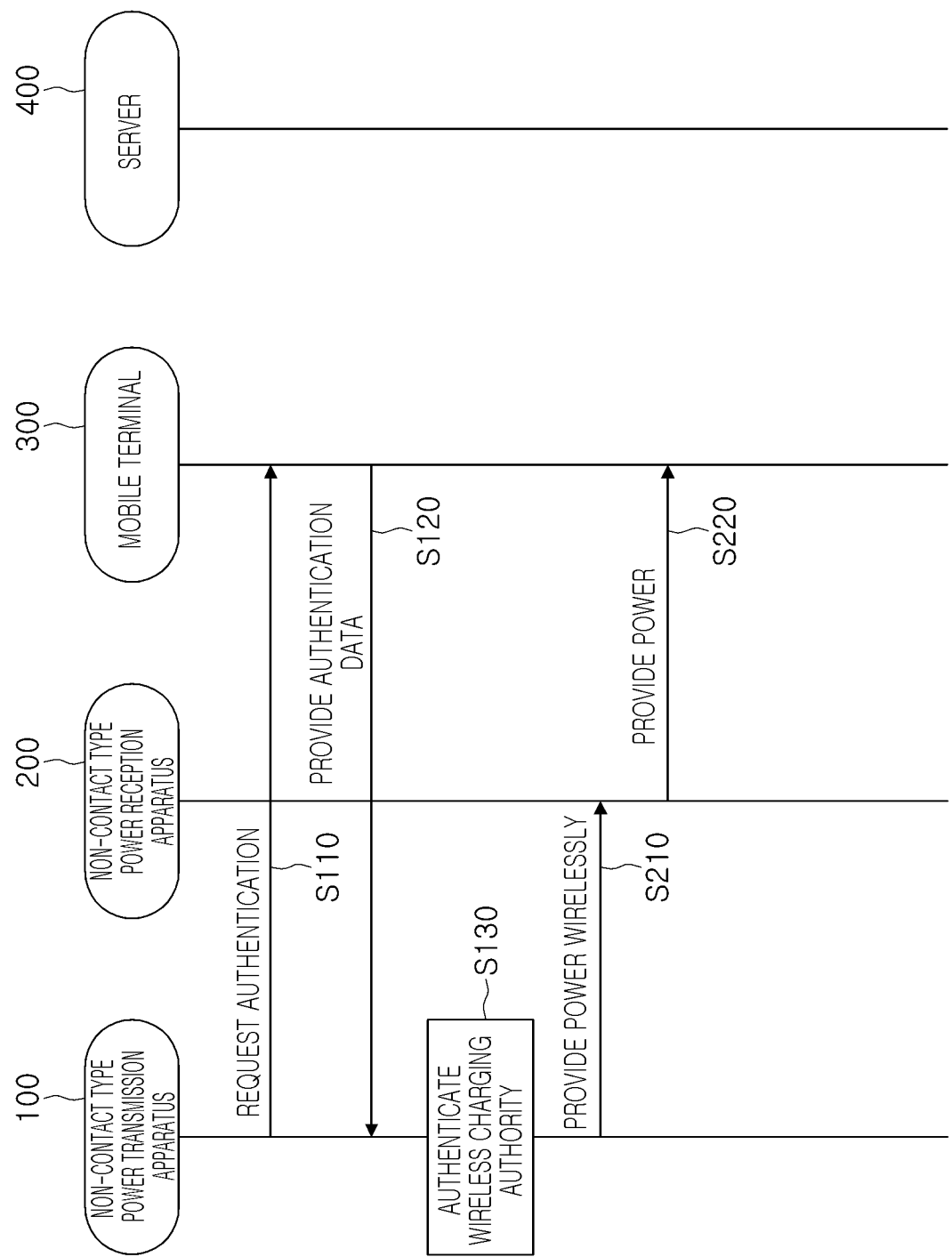

Authentication methods illustrated in FIGS. 9B and 9C relate to methods to perform the authentication using the mobile terminal 300. However, the operations S210 to S220, after the authentication is performed, may correspond to those described above in FIG. 9A.

As shown in FIG. 9B, at operation 110, the non-contact type power transmission apparatus 100 requests authentication data from the mobile terminal 300. To this end, the non-contact type power transmission apparatus 100 may perform direct communications with the mobile terminal 300 using a local area wireless communications scheme, or the like.

The mobile terminal 300 may provide the authentication data to the non-contact type power transmission apparatus 100.

According to an exemplary embodiment illustrated in FIG. 9B, the mobile terminal 300 provides or transmits the authentication data to the non-contact type power reception apparatus 200. The non-contact type power reception apparatus 200 provides or transmits the authentication data to the non-contact type power transmission apparatus 100. In one example, the non-contact type power transmission apparatus 100 and the non-contact type power reception apparatus 200 transmit and receive the authentication data according to a predetermined wireless power transmission protocol.

According to an embodiment illustrated in FIG. 9C, the mobile terminal 300 transmits the authentication data to the non-contact type power transmission apparatus 100. For example, the mobile terminal 300 and the non-contact type power transmission apparatus 100 perform direct communications using the local area wireless communication scheme.

Figure 9D:
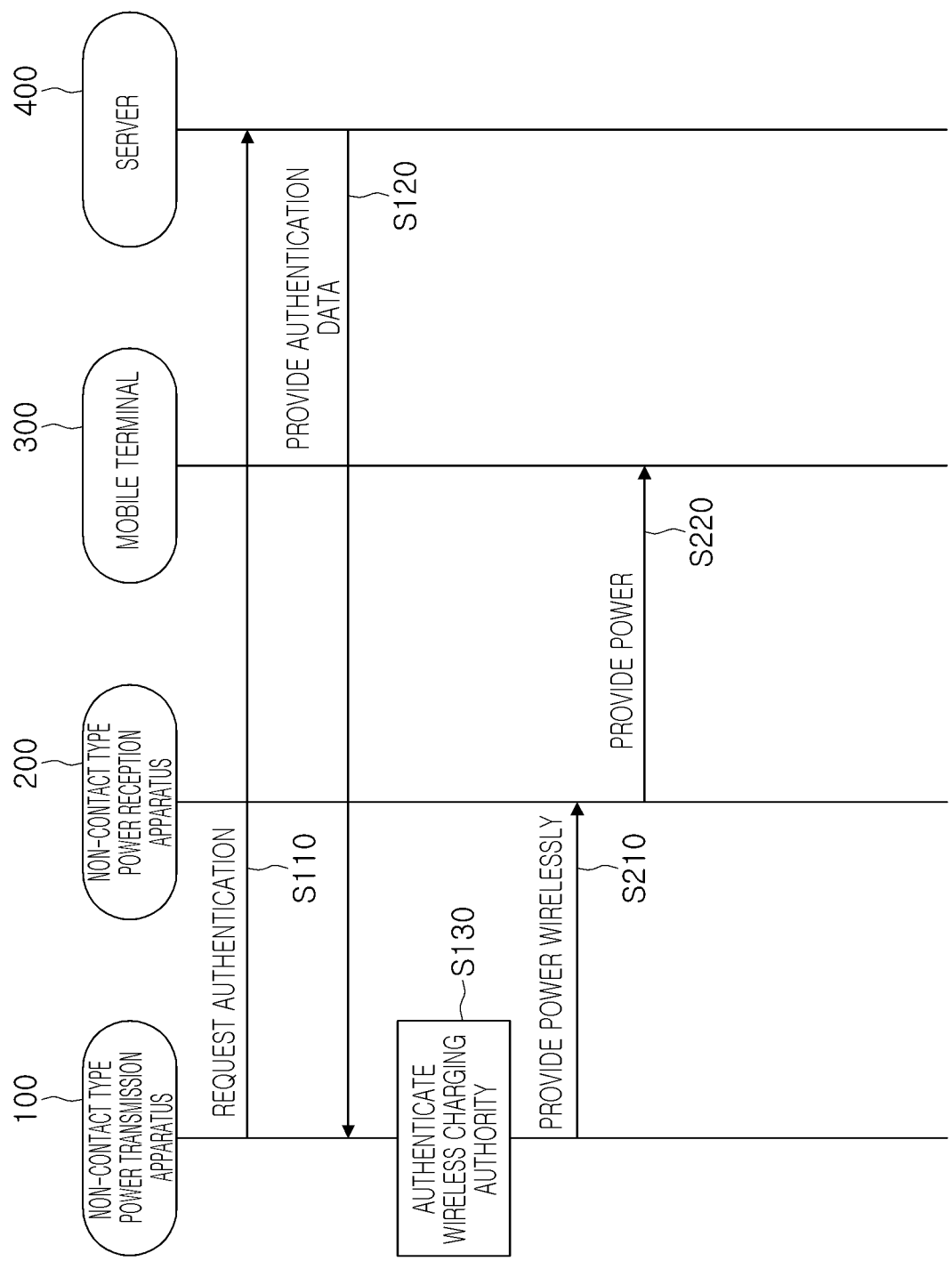

FIG. 9D illustrates another embodiment of the authentication method. The authentication method illustrated in FIG. 9D relates to a method of performing the authentication using the server 400. However, the operations S210 to S220 after the authentication is performed correspond to those described above.

According to the embodiments illustrated in FIGS. 9A through 9C, the non-contact type power transmission apparatus 100 may by itself perform the authentication for the mobile terminal 300 using authentication information. For example, the non-contact type power transmission apparatus 100 includes a verification unit which verifies the authentication information to perform the authentication.

According to an embodiment, the non-contact type power transmission apparatus 100 communicates with the server 400 to perform the authentication of the mobile terminal 300.

For instance, at operation S110, the non-contact type power transmission apparatus 100 requests the authentication data from the server 400. The non-contact type power transmission apparatus 100 authenticates the mobile terminal 300 or the non-contact type power reception apparatus 200 using the authentication data received from the server 400.

As described above, the authentication data may include additional information, in addition to whether or not the authentication is possible, for example, information regarding whether or not the authentication is charged, and an authenticatable time. The server 400 provides or transmits the additional information to the non-contact type power transmission apparatus 100 to allow the non-contact type power transmission apparatus 100 to provide power wirelessly in a wider range of aspects.

Figure 9E:
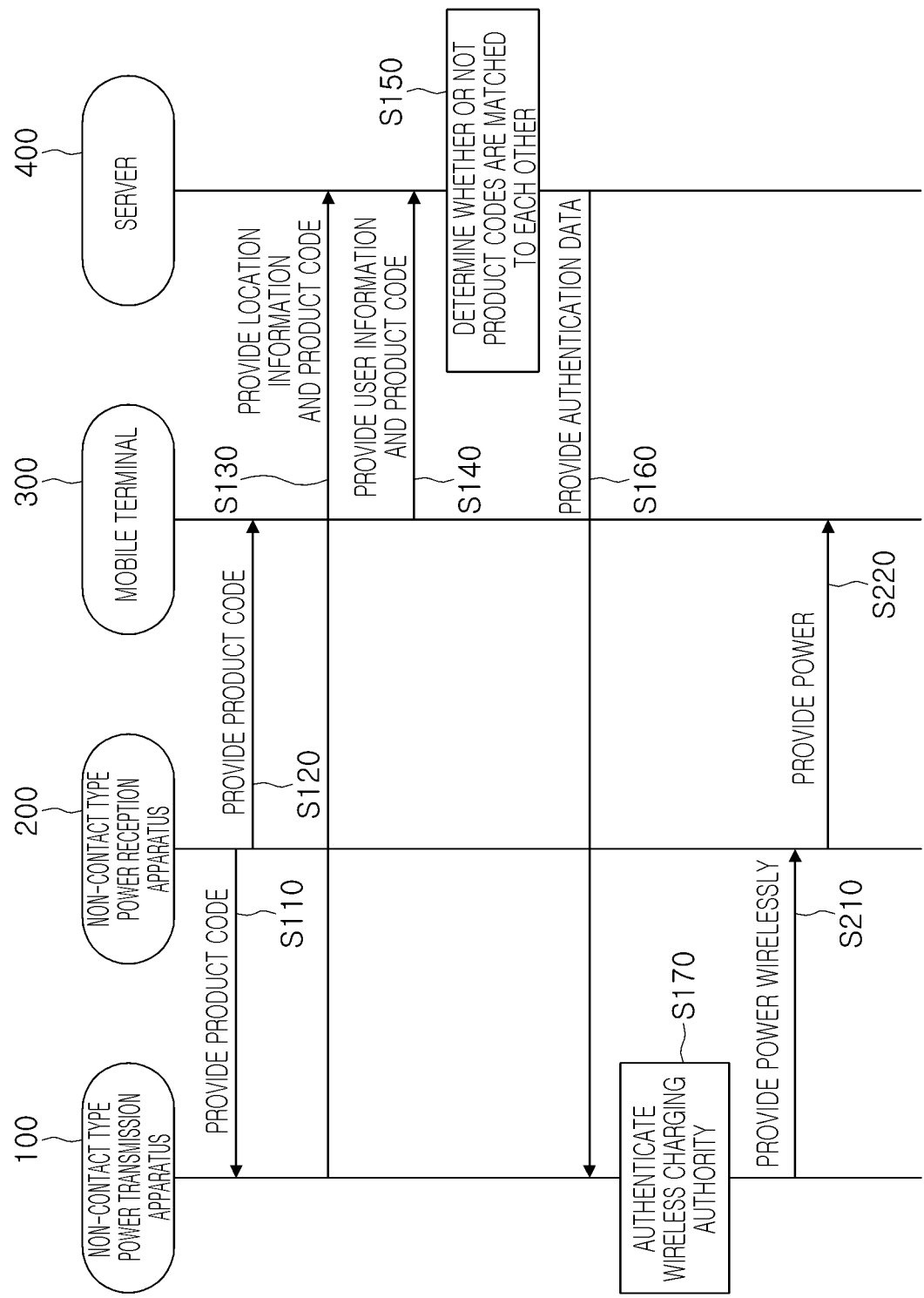

Further, referring to FIG. 9E, at operations S110 and S120, the non-contact type power reception apparatus 200 transmits an individual product code to the non-contact type power transmission apparatus 100 and the mobile terminal 300. At operation S130, the non-contact type power transmission apparatus 100 transmits location information and the product code to the server 400. At operation S140, the mobile terminal 300 transmits user information and the product code to the server 400. At operation S150, the server 400 determines whether or not the product codes from the mobile terminal 300 and the non-contact type power transmission apparatus 100, respectively, match each other. At operation S160, the server 400 transmits authentication data authenticating power transmission to the non-contact type power transmission apparatus 100.

Subsequently, at operation S170, the non-contact type power transmission apparatus 100 receives the authentication of a charging authority, and charges the mobile terminal 300 with power through the non-contact type power reception apparatus 200.

FIGS. 10A through 10D are flowcharts illustrating various embodiments of a method of providing information to select location-based service data.

Figure 10A:
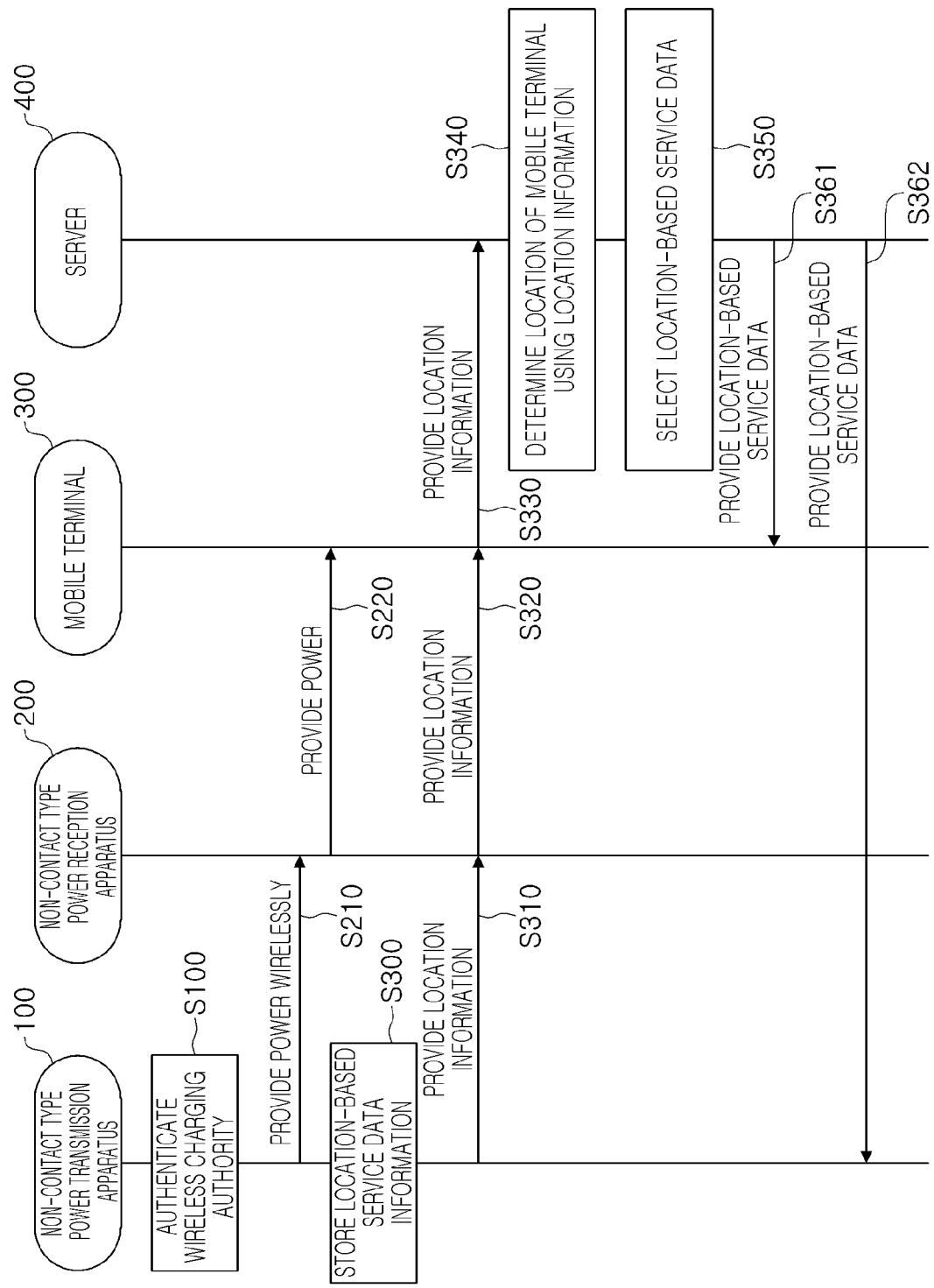
FIGS. 10A through 10D are flowcharts illustrating various embodiments of a method of providing information to select location-based service data.

Referring to FIG. 10A, when the wireless charging authority is determined, the non-contact type power transmission apparatus 100 transmits to the server 400 location information assigned to the non-contact type power transmission apparatus 100. The location information would be transmitted through the non-contact type power reception apparatus 200 and the mobile terminal 300. However, the authentication process may also be omitted, in accordance with an alternative embodiment.

As a communications method between the non-contact type power transmission apparatus 100 and the non-contact type power reception apparatus 200, or a communications method between the non-contact type power reception apparatus 200 and the mobile terminal 300, various configurations may be applied as described above. For example, various configurations such as using a protocol for wirelessly transmitting power, or using a local area wireless communications scheme may be applied.

At operation S340, the server 400 determines a location of the mobile terminal 300 using location information of the non-contact type power transmission apparatus 100. For instance, the server 400 identifies a location in which the non-contact type power transmission apparatus 100 is installed using location information of the non-contact type power transmission apparatus 100, and determines the identified location as the location of the mobile terminal 300.

At operation S350, the server 400 selects the location-based service data associated with the identified location. At operation S361, the server 400 provides or transmits the selected location-based service data to the mobile terminal 300 or, at operation S362, transmits the selected location-based service data to the non-contact type power transmission apparatus 100.

According to an embodiment, at operation S350, the server 400 may further select the location-based service data using user information of the mobile terminal 300. For example, the server 400 determines a type, a quality, or paid-for or free-of-charge authority of the location-based service data depending on a user class of service or authority of the user. For example, the location-based service data includes a coupon, and authority to charge for free. Alternatively, the location-based service data may also be provided in a case in which a specific condition, such as, viewing a provided advertisement is satisfied.

Figure 10B:
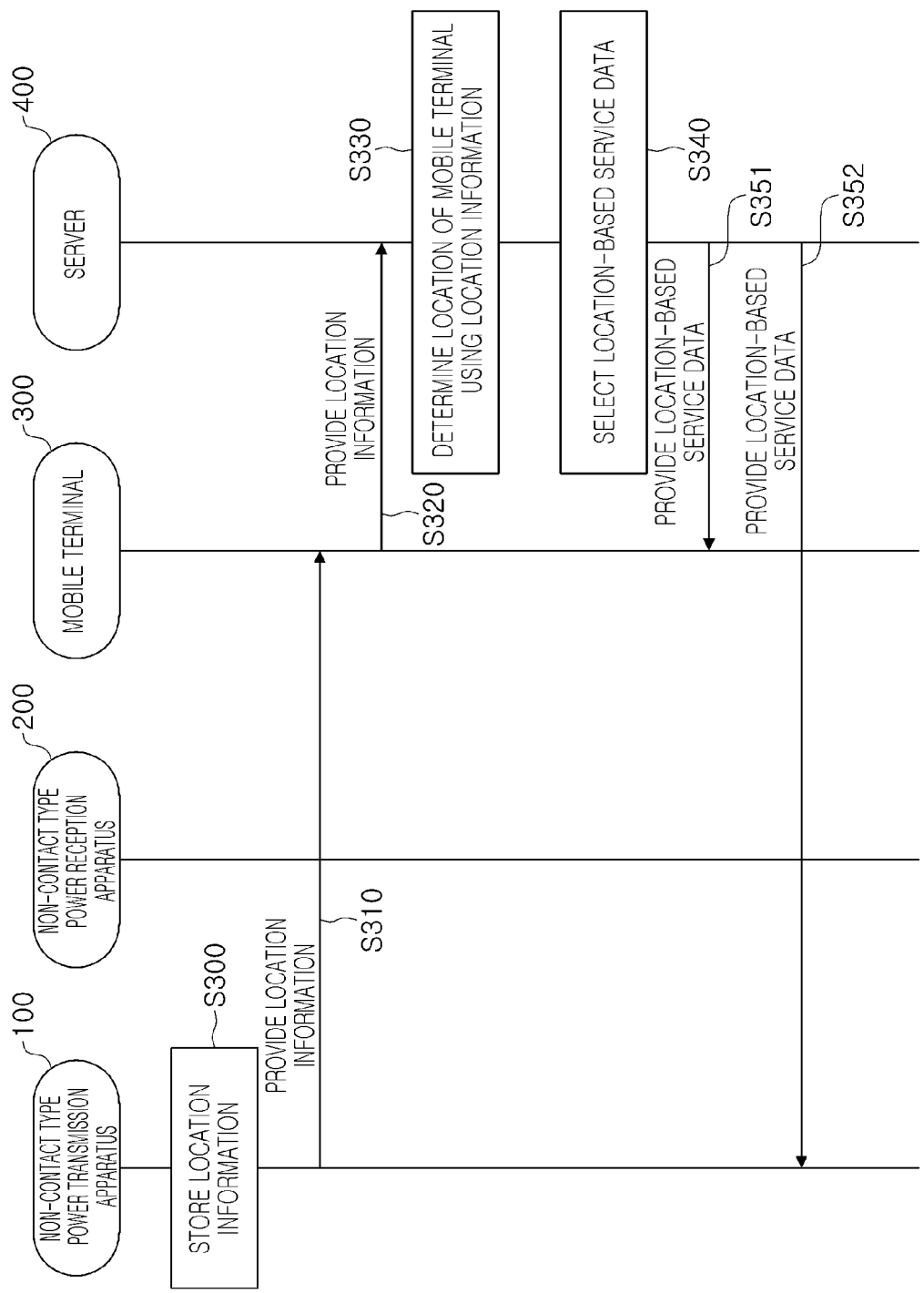

Referring to FIG. 10B, at operation S310, the non-contact type power transmission apparatus 100 transmits location information of the non-contact type power transmission apparatus 100 to the mobile terminal 300, and, at operation S320, the mobile terminal 300 transmits the location information of the non-contact type power transmission apparatus 100 to the server 400. Depending on an embodiment, the mobile terminal 300 may also provide user information assigned to itself to the server 400.

Figure 10C:
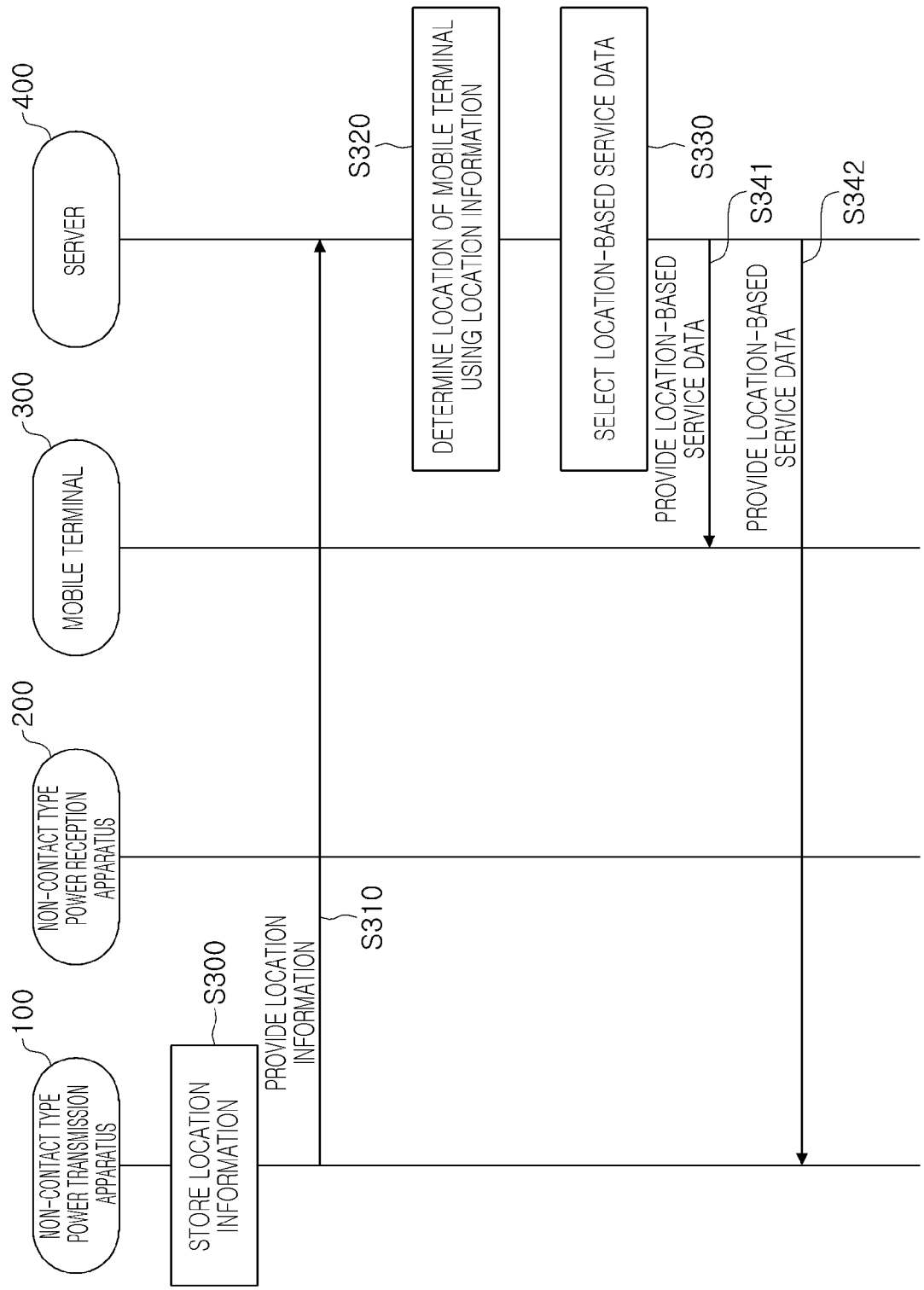

Referring to FIG. 10C, at operation S310, the non-contact type power transmission apparatus 100 directly provides or transmits location information of the non-contact type power transmission apparatus 100 to the server 400. Depending on an embodiment, the non-contact type power transmission apparatus 100 may obtain from the mobile terminal 300 user information assigned to the mobile terminal 300, and may provide the obtained user information and location information to the server 400.

Figure 10D:
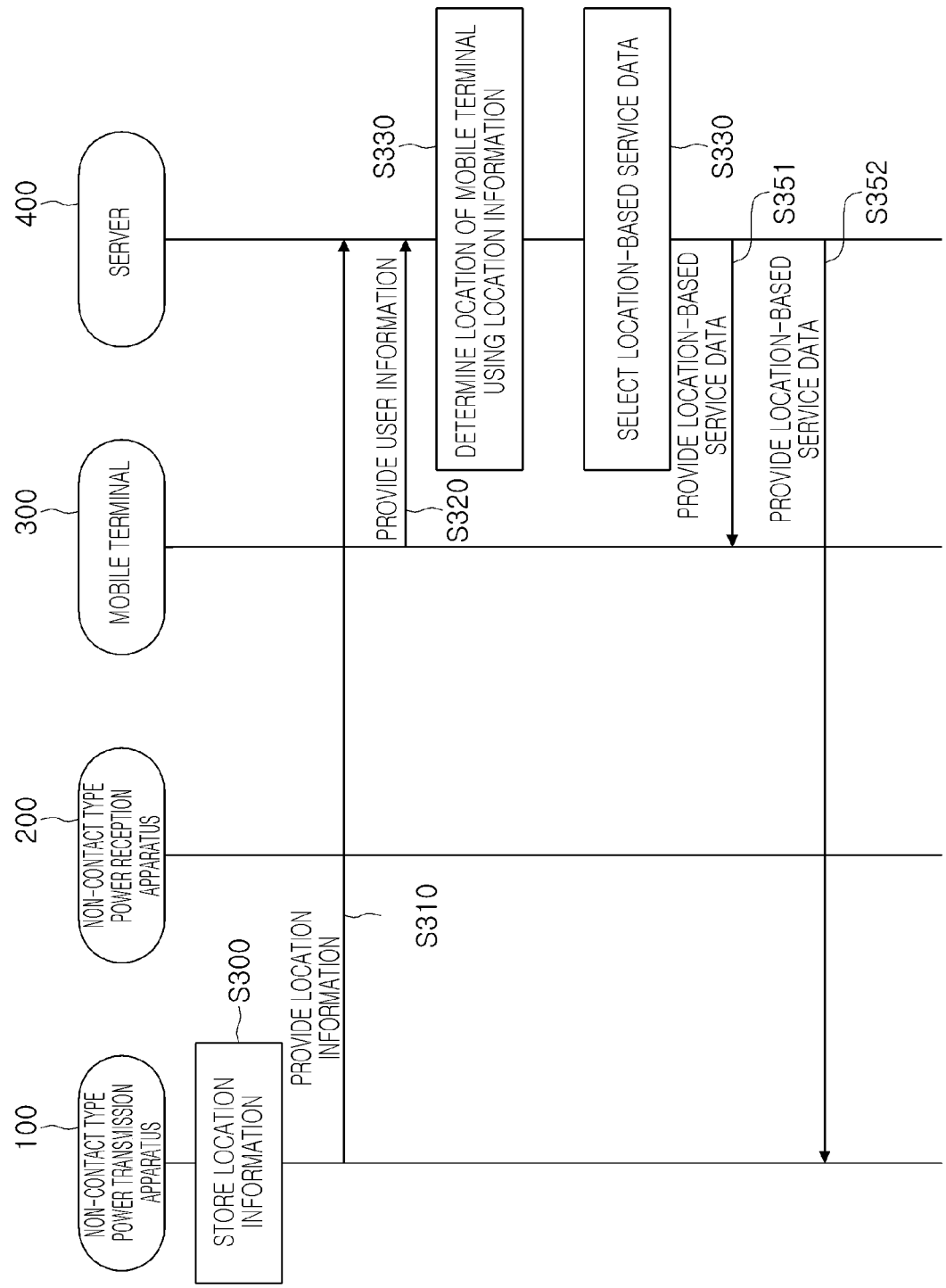

Referring to FIG. 10D, at operation S310, the non-contact type power transmission apparatus 100 directly transmits location information to the server 400, and, at operation S320, the mobile terminal 300 may transmit user information to the server. At operation S330, the server 400 transmits the location-based service data by detecting the location of the mobile terminal 300 using location information. At operation S340, the server 400 processes user information to select the location-based service data. At operation S351, the location-based service data of the server 400 is transmitted to the mobile terminal 300. In the alternative, at operation S352, the location-based service data of the server 400 is transmitted to the non-contact type power transmission apparatus 100 (S351, S352).

Figure 11:
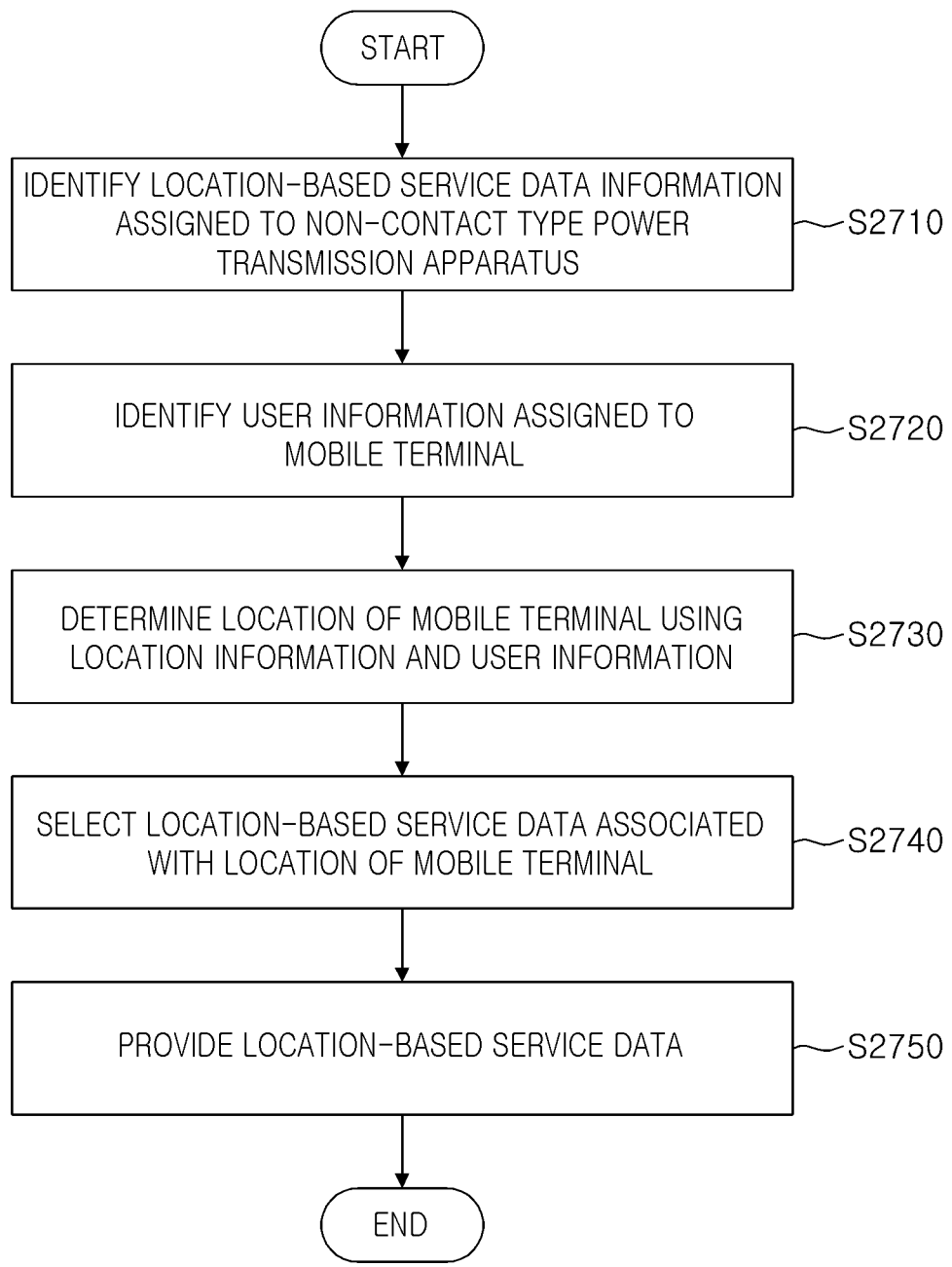
FIG. 11 is a flowchart illustrating an embodiment of a method of providing location-based service data.

FIG. 11 is a flowchart illustrating an embodiment of a method to provide location-based service data performed on the server 400.

At operation S2710, the server 400 identifies location information assigned to the non-contact type power transmission apparatus 400.

At operation S2720, the server 400 identifies user information assigned to the mobile terminal 300.

At operation S2730, the server 400 determines the location of the mobile terminal 300 using location information and user information.

At operation S2740, the server 400 selects location-based service data associated with the determined location of the mobile terminal 300. At operation S2750, the server 400 provides or transmits the selected location-based service data to the mobile terminal 300 or the non-contact type power transmission apparatus 100.

The apparatuses, units, elements, modules, devices, and other components illustrated in FIGS. 1 through 8 that perform the operations described herein with respect to FIGS. 9A through 11 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 9A through 11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 9A through 11 that perform the operations described herein with respect to FIGS. 1 through 8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As described above, according to embodiments, a location-based service is provided by using information regarding the location at which wireless power charging is performed. The location is accurately identified independent of an influence of an environment around the user by, at least, providing the location-based service to the user based on the location of the wireless power charging apparatus. In addition, because the wireless power charging and the location-based service are provided at the same time, service accessibility of the user is expanded. The received location-based service data is displayed at the display unit allowing the user to select the location-based service data, such that the selected location-based service data is transmitted to the mobile terminal.

As set forth above, according to various embodiments, the location-based service is provided to the user using information regarding the location at which power is wirelessly charged.

According to an embodiment, the location is accurately identified independent of an environmental influence around the user by providing the location-based service to the user based on the location of the wireless power charging apparatus.

According to an embodiment, because the wireless power charging and the location-based service are provided at the same time, service accessibility of the user is expanded.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A non-contact type power transmission apparatus, comprising:
   a control unit configured to provide, to a device, assigned location information of the non-contact type power transmission apparatus;
   a charge control unit configured to determine whether to self-authenticate the device or authenticate using a server based on whether a selectable location-based service data, other than charging, is provided to the device, and authenticate the device for non-contact type power transmission as a location-based power service; and
   in response to the selectable location-based service data being provided, a display unit configured to display data of the selectable location-based service provided to the device based on the assigned location information.

2. The non-contact type power transmission apparatus of claim 1, wherein the display unit receives a selection of the selectable location-based service data from a user, and
   the control unit transmits the selected location-based service data to the device outside of the non-contact type power transmission apparatus, or requests transmission of the selected location-based service data from the device.

3. The non-contact type power transmission apparatus of claim 1, wherein the control unit comprises an information management unit configured to provide the assigned location information to the device outside of the non-contact type power transmission apparatus, and wherein the charging control unit is further configured to charge the device using non-contact type power transmission.

4. The non-contact type power transmission apparatus of claim 3, wherein the information management unit provides the assigned location information to the device in response to the authentication for the charging being determined.

5. The non-contact type power transmission apparatus of claim 3, wherein the charging control unit performs the authentication using at least one of telecommunications company information, terminal information, user information, or residual power information stored on a mobile terminal which is charged with power.

6. The non-contact type power transmission apparatus of claim 3, wherein the charging control unit determines the authority or a provision time for the charging using authentication information according to the assigned location information.

7. The non-contact type power transmission apparatus of claim 3, further comprising:
   a communications unit operatively connected to a server providing the selected location-based service data,
   wherein the control unit further comprises a service data management unit configured to receive the selected location-based service data associated with the assigned location information from the server.

8. The non-contact type power transmission apparatus of claim 7, wherein the communications unit wirelessly communicates with a mobile terminal, and
   the information management unit obtains user information assigned to the mobile terminal through the communications unit and provides the assigned location information and the user information to the server.

9. The non-contact type power transmission apparatus of claim 7, wherein the communications unit transmits a selection from a user to the server.

10. The non-contact type power transmission apparatus of claim 9, wherein the service data management unit transmits to a mobile terminal the selected location-based service data received from the server through the communication unit.

11. A location-based service apparatus, comprising:
    a non-contact type power transmission apparatus configured to:
    provide power transmission in a non-contact manner as a location-based power service to a mobile terminal through a non-contact type power reception apparatus,
    provide, to the mobile terminal, assigned location information of the non-contact type power transmission apparatus, determine whether to self-authenticate the mobile terminal or authenticate sing a server based on whether a selectable location-based service, other than charging, is provided to the mobile terminal, and in response to the selectable location-based service being provided, display data of the selectable location-based service received from a server, wherein the selectable location-based service data is based on the assigned location information.

12. The location-based service system of claim 11, wherein the non-contact type power transmission apparatus transmits selected location-based service data in the displayed selectable location-based service data to the mobile terminal according to a selection from a user, or requests the server to transmit the selected location-based service data to the mobile terminal according to the selection from the user.

13. The location-based service system of claim 11, wherein the server receives user information from the mobile terminal and provides the selectable location-based service data.

14. The location-based service system of claim 11, wherein the server transmits the selectable location-based service data to at least one of the non-contact type power transmission apparatus, the non-contact type power reception apparatus, and the mobile terminal.

15. The location-based service system of claim 11, wherein the server receives:
the assigned location information from the non-contact type power transmission apparatus,
a product code of the non-contact type power reception apparatus receiving power from the non-contact type power transmission apparatus,
user information of the mobile terminal, and
a product code of the non-contact type power reception apparatus charging the mobile terminal with power; and
authenticates power transmission of the non-contact type power transmission apparatus in response to a match of the product codes.

16. The location-based service system of claim 11, wherein the non-contact type power transmission apparatus obtains a power transmission authentication from at least one of the non-contact type power reception apparatus, the mobile terminal, and the server, and transmits the power in the non-contact manner.

17. A non-contact type power reception apparatus of a mobile terminal, comprising:

a power reception unit configured to wirelessly receive power as a location-based power service and charge the mobile terminal using the wirelessly received power; and
an information transferring unit configured to simultaneously receive data of a selectable location-based service based on user information, and location information, depending on whether the power reception unit self-authenticates the mobile terminal or authenticates using a server.

18. The non-contact type power reception apparatus of claim 17, wherein the selectable location-based service data comprises information associated with the received location information.

19. The non-contact type power reception apparatus of claim 17, wherein the mobile terminal transmits the user information of the mobile terminal to a non-contact type power transmission apparatus, without passing the user information by the non-contact type power reception apparatus.

20. A non-contact type power transmission apparatus, comprising:
a charging control unit configured to determine whether to self-authenticate a non-contact type power reception apparatus or authenticate using a server based on whether a selectable location-based service, other than charging, is provided to the non-contact type power reception apparatus, and authenticate the non-contact type power reception apparatus in a mobile terminal for a power service;
a service data management unit configured to transmit, to the mobile terminal, data of the selectable location-based service associated with a region in which the non-contact type power transmission apparatus is located based on user information in response to the selectable location-based service being provided; and
a power transmission unit configured to wirelessly transmit power to the mobile terminal, wherein the selectable location-based service data and the power are simultaneously transmitted to the mobile terminal.

21. The non-contact type power transmission apparatus of claim 20, further comprising:
a display unit configured to display the selectable location-based service data.

22. The non-contact type power transmission apparatus of claim 20, wherein the charging control unit performs authentication using at least one of telecommunications company information, terminal information, user information, and residual power information of the mobile terminal.

* * * * *